(12) United States Patent
Ruiz Lara et al.

(10) Patent No.: US 10,899,454 B2
(45) Date of Patent: Jan. 26, 2021

(54) SEAT SUPPORT SYSTEM

(71) Applicant: Safran Seats USA LLC, Gainesville, TX (US)

(72) Inventors: Oscar Ruiz Lara, Chih (MX); Jose Ramon Madrigal Carmona, Chih (MX); Patricia Luevano Gonzalez, Chih (MX)

(73) Assignee: Safran Seats USA LLC, Gainesville, TX (US)

( * ) Notice: Subject to any disclaimer, the term of this patent is extended or adjusted under 35 U.S.C. 154(b) by 28 days.

(21) Appl. No.: 16/022,316

(22) Filed: Jun. 28, 2018

(65) Prior Publication Data

US 2018/0305022 A1  Oct. 25, 2018

Related U.S. Application Data

(62) Division of application No. 15/506,268, filed as application No. PCT/US2015/046876 on Aug. 26, 2015, now Pat. No. 10,035,599.

(60) Provisional application No. 62/041,761, filed on Aug. 26, 2014, provisional application No. 62/041,757, (Continued)

(51) Int. Cl.
*B64D 11/06* (2006.01)
*B60N 2/68* (2006.01)
*A47C 7/44* (2006.01)

(52) U.S. Cl.
CPC ............. *B64D 11/06* (2013.01); *A47C 7/44* (2013.01); *B60N 2/686* (2013.01); *B64D 11/0647* (2014.12)

(58) Field of Classification Search
CPC . B60N 2/643; B60N 2/64; B60N 2/68; B60N 2/686; B60N 2002/684; B60N 2/707; B64D 11/06; A47C 7/16; A47C 7/44
See application file for complete search history.

(56) References Cited

U.S. PATENT DOCUMENTS 3,565,482 A * 2/1971 Blodee .................... A47C 7/14
297/284.3
3,873,155 A   3/1975 Barecki
(Continued)

FOREIGN PATENT DOCUMENTS

DE   2723722 A1 * 12/1978 ............. B60N 2/686
DE   202010000811 U1 * 5/2011 ............. A47C 7/024
(Continued)

OTHER PUBLICATIONS

International Patent Application No. PCT/US2015/046876, Search Report and Written Opinion, dated Nov. 9, 2015.
(Continued)

*Primary Examiner* — Timothy J Brindley
(74) *Attorney, Agent, or Firm* — Kilpatrick Townsend & Stockton LLP

(57) ABSTRACT

Described is a passenger seat that includes a seat bottom assembly with a forward edge and a rear edge and a seat back assembly extending up from the rear edge of the seat bottom assembly. The seat back assembly may include a frame, a plurality of panels within a perimeter of the frame, and at least one attachment member configured to attach the plurality of panels to the frame. The seat bottom assembly may include a frame and a plurality of panels within a perimeter of the frame.

17 Claims, 23 Drawing Sheets

Related U.S. Application Data filed on Aug. 26, 2014, provisional application No. 62/041,759, filed on Aug. 26, 2014.

(56) References Cited

U.S. PATENT DOCUMENTS

| | | | |
|---|---|---|---|
| 4,585,272 A * | 4/1986 | Ballarini | A47C 3/12 |
| | | | 297/284.3 |
| 4,730,872 A * | 3/1988 | Golzer | A47C 11/00 |
| | | | 297/232 |
| 4,871,209 A | 10/1989 | Handelman | |
| 6,079,782 A | 6/2000 | Berg et al. | |
| 6,595,586 B2 | 7/2003 | Brightbill et al. | |
| 6,663,178 B2 | 12/2003 | Fourrey et al. | |
| 6,910,736 B2 | 6/2005 | White | |
| 7,387,339 B2 | 6/2008 | Bykov et al. | |
| 7,909,402 B2 * | 3/2011 | Chu | A47C 7/465 |
| | | | 297/284.3 |
| 2003/0197413 A1 | 10/2003 | Walker et al. | |
| 2004/0195882 A1 | 10/2004 | White et al. | |
| 2005/0253436 A1 | 11/2005 | Dowty et al. | |
| 2006/0255635 A1 | 11/2006 | Iijima et al. | |
| 2007/0267543 A1 | 11/2007 | Boren et al. | |
| 2008/0136240 A1 | 6/2008 | Matthews et al. | |
| 2008/0290715 A1 | 11/2008 | Fullerton et al. | |
| 2009/0174235 A1 | 7/2009 | Olsen et al. | |
| 2011/0108666 A1 | 5/2011 | Pozzi et al. | |
| 2011/0127823 A1 | 6/2011 | Behrens | |
| 2011/0148167 A1 | 6/2011 | Westerink et al. | |
| 2011/0241394 A1 | 10/2011 | Yamaguchi et al. | |
| 2014/0084661 A1 | 3/2014 | Awata et al. | |
| 2014/0159450 A1 | 6/2014 | Guering | |
| 2014/0159455 A1 | 6/2014 | Thomaschewski et al. | |
| 2014/0203599 A1 | 7/2014 | Line et al. | |
| 2014/0232153 A1 | 8/2014 | Bell et al. | |
| 2015/0115668 A1 | 4/2015 | Martinak et al. | |
| 2016/0052434 A1 | 2/2016 | Himmel, IV et al. | |
| 2016/0347224 A1 | 12/2016 | Line et al. | |
| 2017/0036580 A1 | 2/2017 | Munechika | |
| 2017/0217347 A1 | 8/2017 | McKibbin et al. | |

FOREIGN PATENT DOCUMENTS

| | | | |
|---|---|---|---|
| DE | 202017105836 U1 * | 10/2017 | A47C 7/402 |
| WO | 2002102203 | 12/2002 | |
| WO | 2005060598 | 7/2005 | |

OTHER PUBLICATIONS

U.S. Appl. No. 15/506,268, Restriction Requirement, dated Jul. 3, 2017.

U.S. Appl. No. 15/506,268, Non-Final Rejection, dated Sep. 22, 2017.

U.S. Appl. No. 15/506,268, Final Rejection, dated Jan. 17, 2018.

U.S. Appl. No. 15/506,268, Notice of Allowance, dated Mar. 30, 2018.

* cited by examiner

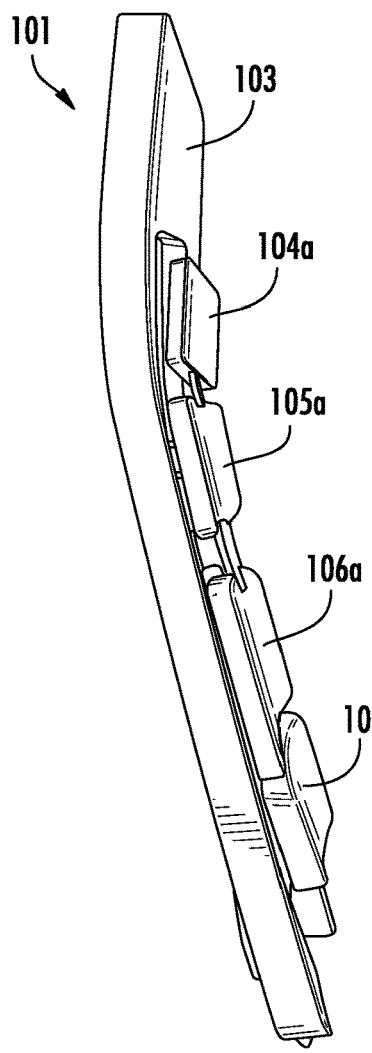
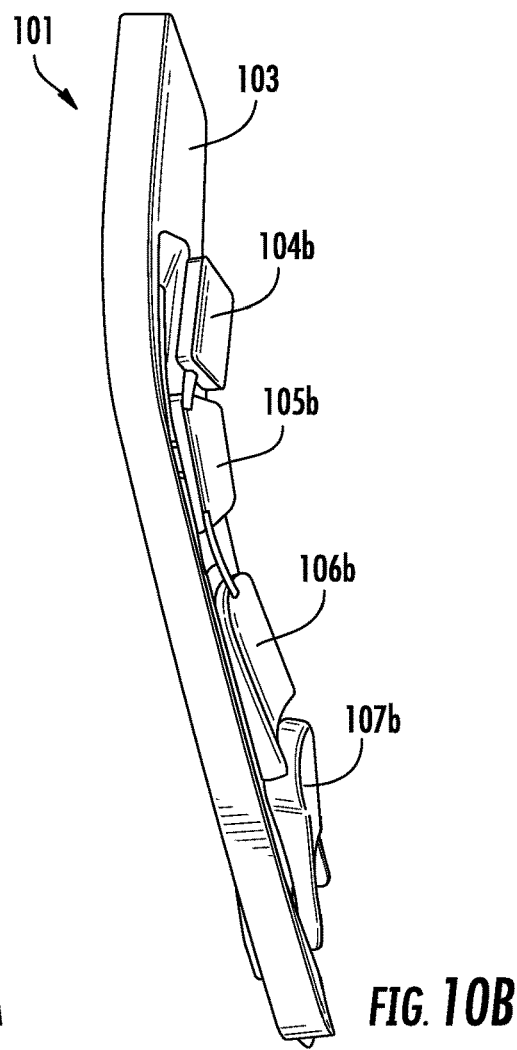
FIG. 10A    FIG. 10B
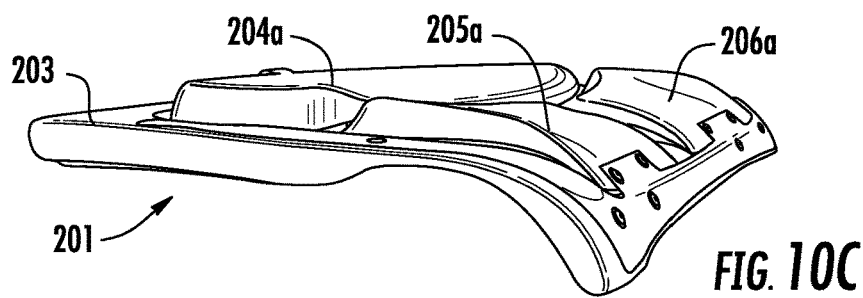
FIG. 10C
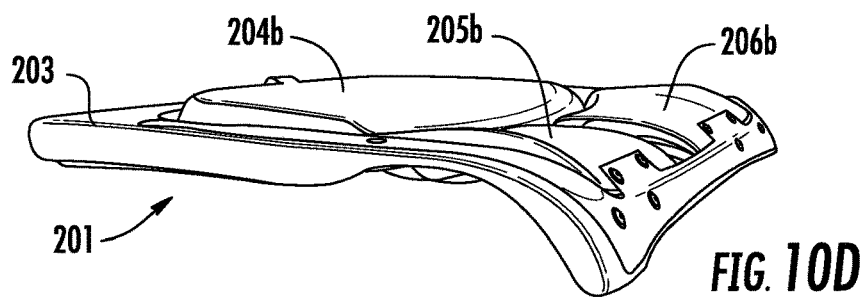
FIG. 10D

SEAT SUPPORT SYSTEM

CROSS REFERENCE TO RELATED APPLICATIONS

This patent application is a division of U.S. Non-Provisional patent application Ser. No. 15/506,268 ("the '268 application"), filed on Feb. 24, 2017, which patent application is the U.S. national stage of PCT/US2015/046876 ("the '876 application"), filed on Aug. 26, 2015, which application is related to and claims priority benefit from U.S. Provisional Application No. 62/041,761 ("the '761 application"), filed on Aug. 26, 2014, entitled ACTIVE SUPPORT SYSTEM FOR AN AIRCRAFT SEAT BACK AND BOTTOM; from U.S. Provisional Application No. 62/041,757 ("the '757 application"), filed on Aug. 26, 2014, entitled ARTICULATED SEAT BACK AND BOTTOM; and from U.S. Provisional Application No. 62/041,759 ("the '759 application"), filed on Aug. 26, 2014, entitled ACTIVE SUPPORT SYSTEM FOR THE AIRCRAFT SEAT BACK AND BOTTOM. The '268 application, the '876 application, the '761 application, the '757 application, and the '759 application are hereby incorporated in their entireties by this reference.

FIELD OF THE INVENTION

The field of the invention relates ergonomic passenger seats for aircraft or the like.

BACKGROUND

Many passenger seats such as those on passenger aircraft, buses, trains, and the like account for significant weight of the vehicle but must meet other requirements related to passenger comfort, safety, and convenience. For example, seat structural assemblies are designed to meet specific loading conditions (e.g., crash conditions), and seats often include safety and convenience features (which may be moveable or deployable) including, for example, seat belts, arm rests, tray tables, cocktail tables, and the like. The structural design of conventional seats along with the design of the comfort and convenience features may include inefficiencies that lead to extra undesirable weight.

In certain situations, it may be desirable to design seats and related subcomponents to maximize structural efficiency with load paths configured to transfer load from the passenger through the seat and into the structure of the aircraft. Efficient structural design facilitates lighter designs using less material.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat comprises: a seat bottom assembly with a forward edge and a rear edge; and a seat back assembly extending up from the rear edge of the seat bottom assembly, wherein: the seat back assembly comprises a frame, a plurality of panels within a perimeter of the frame, and at least one attachment member configured to attach the plurality of panels to the frame; and the seat bottom assembly comprises a frame and a plurality of panels within a perimeter of the frame.

In some embodiments, the at least one attachment member comprises an elastic material configured to allow movement of at least one panel of the seat back assembly due to interaction with a passenger seated in the passenger seat.

The at least one attachment member, in certain embodiments, comprises a cross member that extends across a full width of one of the plurality of panels of the seat back assembly.

In some embodiments, the plurality of panels of the seat back assembly comprises four distinct panels.

The four distinct panels, in certain embodiments, are stacked in a vertical direction such that each of the four distinct panels extends from an inner edge on a first side of the perimeter of the frame of the seat back assembly to a second side of the perimeter of the frame of the seat back assembly.

In certain embodiments, each of the four distinct panels is configured to move relative to the frame of the seat back assembly independent of the other three panels.

The seat back assembly, in some embodiments, comprises a rear support structure.

In some embodiments, the rear support structure comprises an "I" shape. In certain embodiments, the rear support structure comprises a vertical rear support member that extends from an approximate center of an uppermost panel to an approximate center of a lowermost panel. The rear support structure, in some embodiments, comprises at least one support pad attached to the vertical rear support member and to one of the plurality of panels of the seat back assembly.

The seat bottom assembly, in some embodiments, comprises a main panel, a forward left leg panel, and a forward right leg panel. In certain embodiments, an underside of the main panel comprises four support pads. In some embodiments, each leg panel comprises a support pad that extends a majority of a width of each leg panel.

According to certain embodiments of the present invention, a passenger seat comprises: a seat bottom assembly comprising a frame, a main panel adjacent to a rear edge of the seat bottom assembly, and two forward leg panel disposed adjacent to a forward edge of the seat bottom assembly; and a seat back assembly extending up from the rear edge of the seat bottom assembly, wherein: the seat back assembly comprises a frame, a plurality of vertically stacked panels within a perimeter of the frame, and at least two attachment members for each panel of the seat back assembly where each attachment member is configured to attach the respective panel to the frame.

In some embodiments, each of the attachment members comprises an elastic material configured to allow movement of at least one panel of the seat back assembly due to interaction with a passenger seated in the passenger seat.

Each of the plurality of vertically stacked panels, in some embodiments, is configured to move relative to the frame of the seat back assembly independent of the other panels.

In certain embodiments, the seat back assembly comprises a rear support structure. The rear support structure, in some embodiments, comprises an "I" shape. The rear support structure, in certain embodiments, comprises a vertical rear support member that extends from an approximate center of an uppermost panel to an approximate center of a lowermost panel.

In some embodiments, the rear support structure comprises at least one support pad attached to the vertical rear support member and to one of the plurality of vertically stacked panels.

BRIEF DESCRIPTION OF THE DRAWINGS

FIGS. 10A and 10B are perspective views of a seat back assembly of the passenger seat of FIG. 1.

FIGS. 10C and 10D are perspective views of a seat bottom assembly of the passenger seat of FIG. 1.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
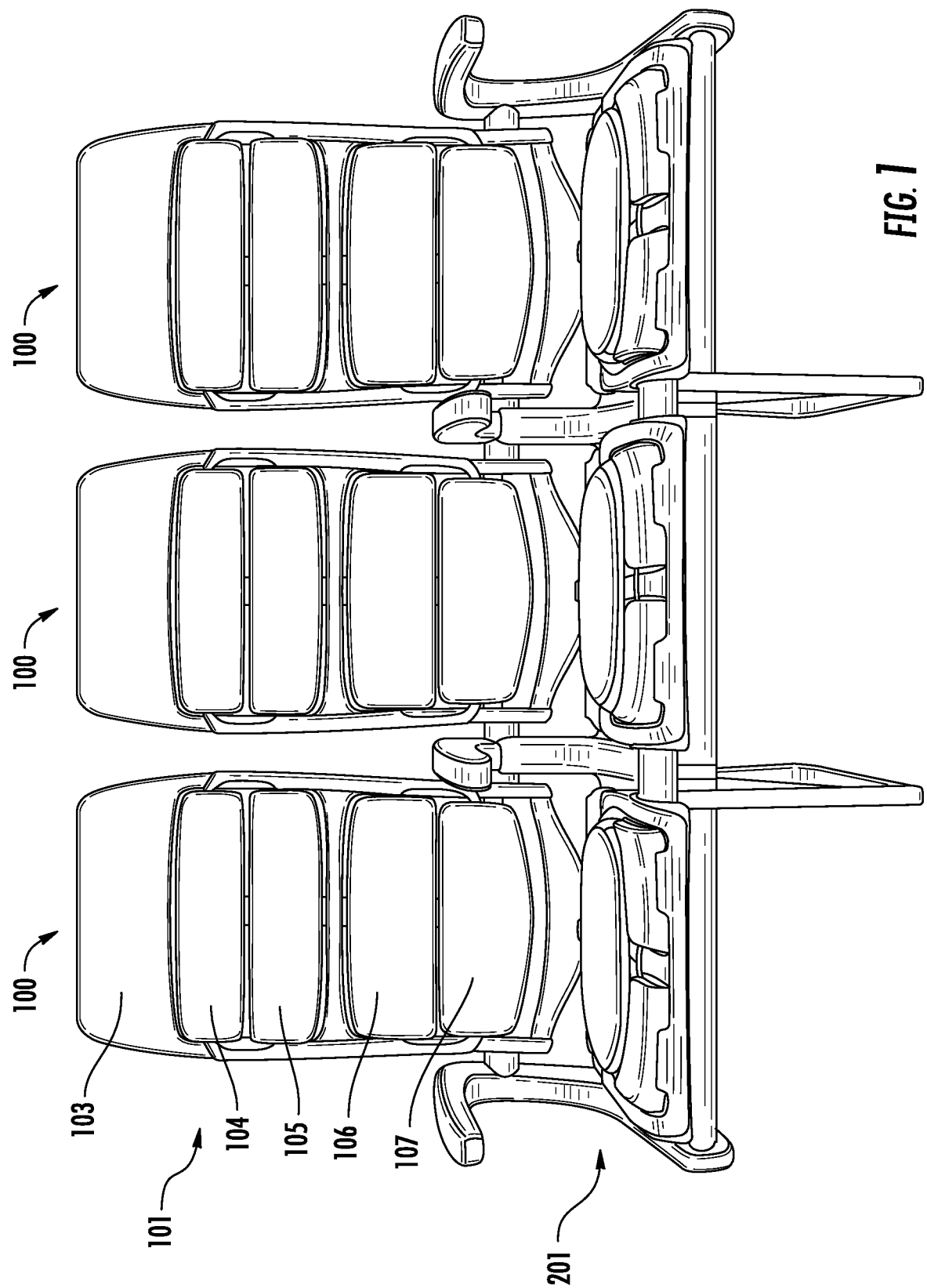
FIG. 1 is a front view of a passenger seat according to certain embodiments of the present invention.
Figure 2:
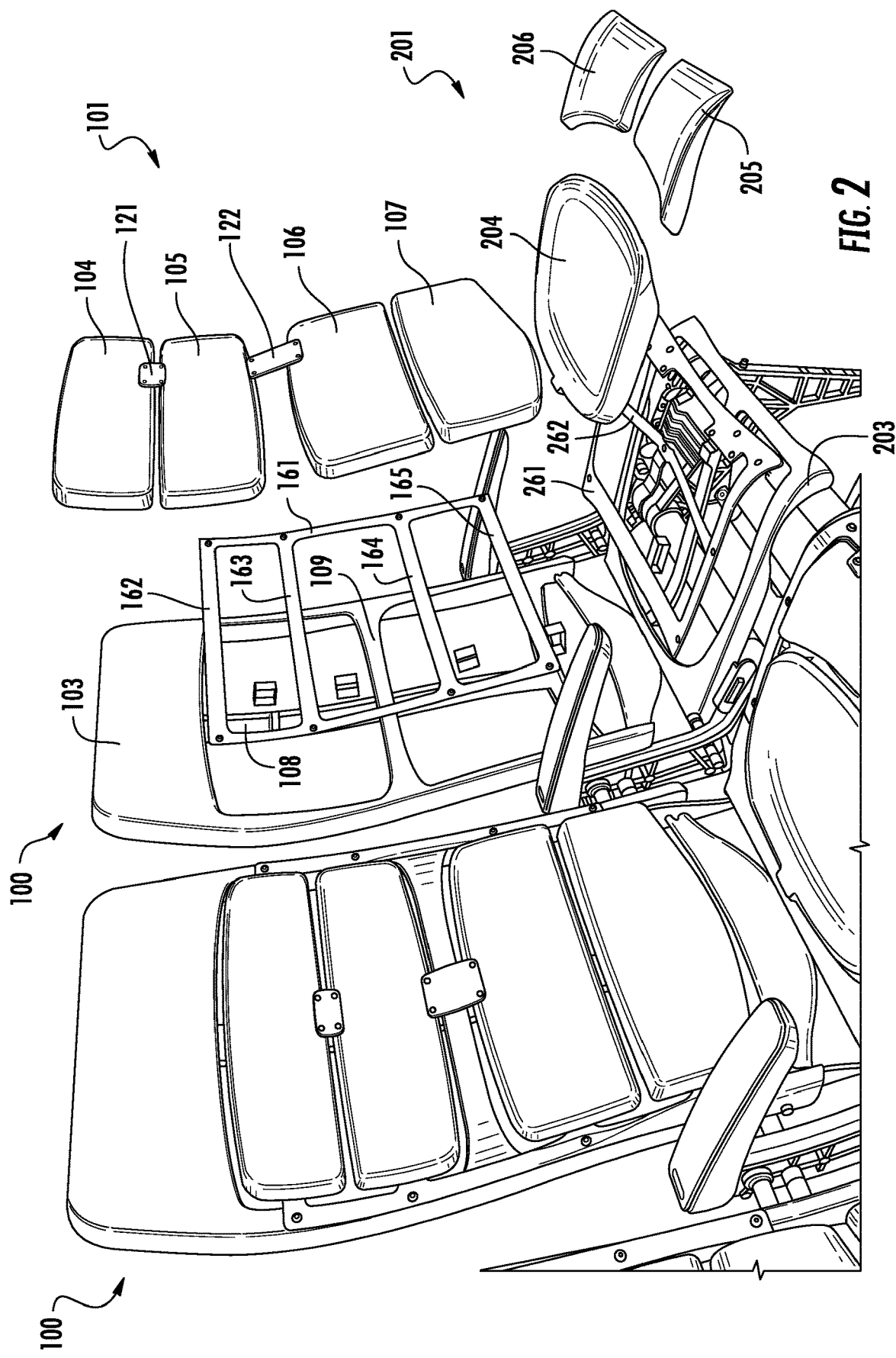
FIG. 2 is an exploded perspective view of the passenger seat of FIG. 1.
Figure 3:
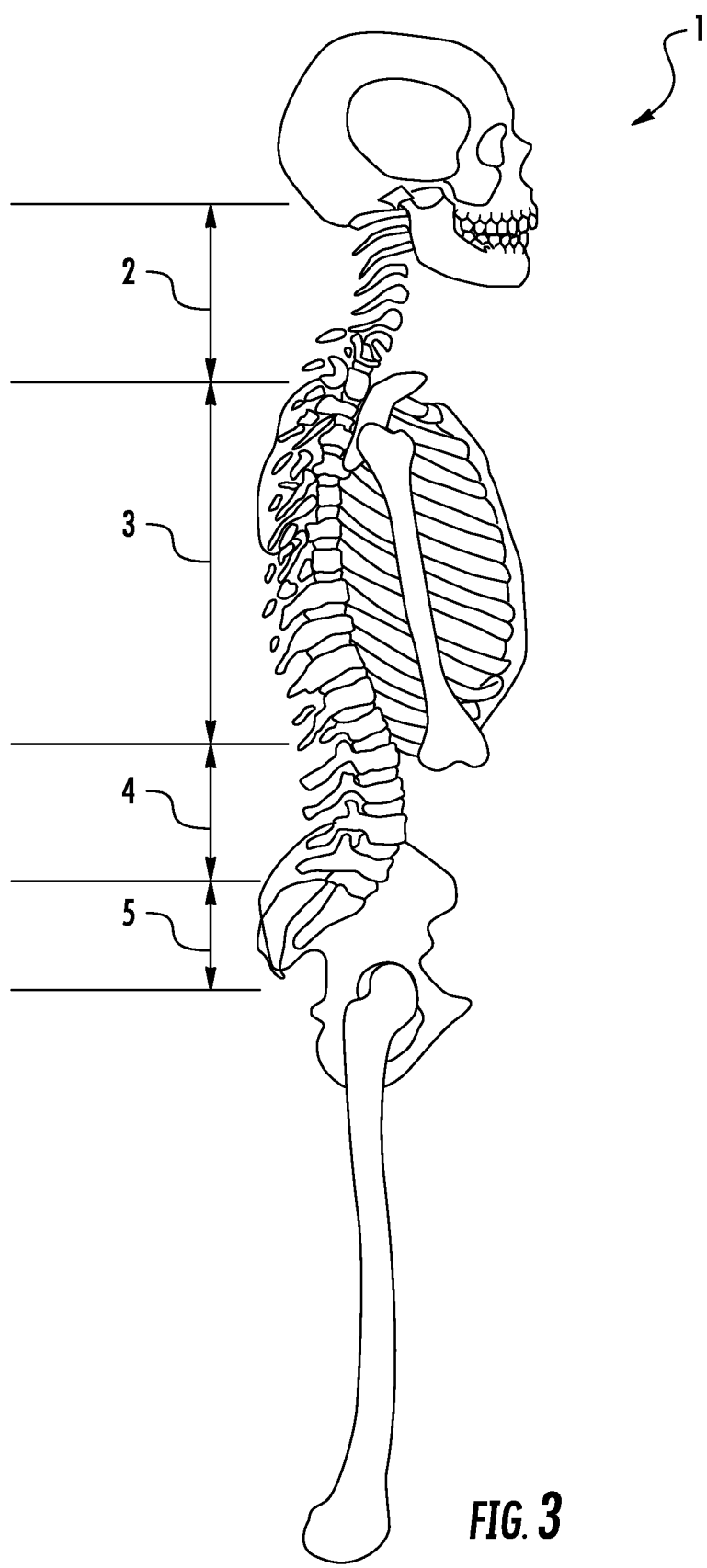
FIG. 3 is a side view of portions of a passenger spine.

FIGS. 1-23 illustrate embodiments of passenger seats 100. In these embodiments, the passenger seat 100 may include a seat back and a seat bottom. For example, as shown in FIGS. 1 and 2, the seat 100 may include a seat back assembly 101 and a seat bottom assembly 201. The seat back assembly 101 may include a frame with a perimeter and a plurality of distinct panels within the perimeter of the frame. For example, the seat back assembly 101 may include a frame 103, a first panel 104, a second panel 105, a third panel 106, and a fourth panel 107. Although FIGS. 1 and 2 show four panels stacked in a vertical direction, the seat back assembly 101 may include any number of panels arranged in any orientation relative to one another (i.e., stacked vertically, stacked horizontally, checkerboard pattern, or any other suitable arrangement). The frame 103 may include a cross member 109, which, in some embodiments, is located between the second panel 105 and the third panel 106. As shown in FIG. 2, the seat bottom assembly 201 may include a frame 203, a main panel 204 (adjacent to a rear edge of the seat bottom assembly 201), and two forward leg panels 205 and 206 (adjacent to a forward edge of the seat bottom assembly 201). In some embodiments, multiple seats 100 are formed together as a single unit to reduce the total number of load paths and to efficiently transfer load from the seats to the aircraft structure.

As shown in FIG. 2, in some embodiments, the seat back assembly 101 may include an attachment member 161 for securing the panels (e.g., one or more of first panel 104, second panel 105, third panel 106, and fourth panel 107) to the frame 103. Similarly, the seat bottom assembly 201 may include an attachment member 261 for attaching the panels (e.g., one or more of main panel 204 and forward leg panels 205 and 206) to frame 203. Although attachment members 161 and 261 are each shown as single grid-like components in FIG. 2, each attachment member may comprise a plurality of components. For example, each of the cross members (162-165, 262) extending across the seat behind each of the panels of the seat back assembly 101 (or under one or more of the panels of the seat bottom assembly 201) may each be a separate component. In particular, first cross member 162 (disposed behind panel 104), second cross member 163 (disposed behind panel 105), third cross member 164 (disposed behind panel 106), and fourth cross member 165 (disposed behind panel 107) may each be separate from one another and from other portions of attachment member 161. In some embodiments, the attachment members 161 and 261 comprise flexible material such that the panels of the seat back assembly 101 and/or the seat bottom assembly 201 may move relative to one another and relative to the respective frame member. As shown in FIG. 2, the cross members 162-165 extend across the full width of the panels 104-107 but are substantially smaller in the vertical or height direction compared to the panels 104-107. The panels of the seat back assembly 101 and/or the seat bottom assembly 201 may include optional connector plates (shown as 121 and 122 in FIG. 2) to constrain adjacent panels relative to one another. In some embodiments, the seat 100 does not include any optional connector plates.

The seat 100 is designed to accommodate a passenger 1 based on human factors engineering for wide ranges of passenger sizes (e.g., $5^{th}$ percentile female to $95^{th}$ percentile male). In particular, the seat 100 is configured to support four sections of a typical passenger 1's spine including the cervical spine 2, the thoracic spine 3, the lumbar spine 4, and the sacrum 5 or tailbone 5 (see FIG. 3).

Figure 4:
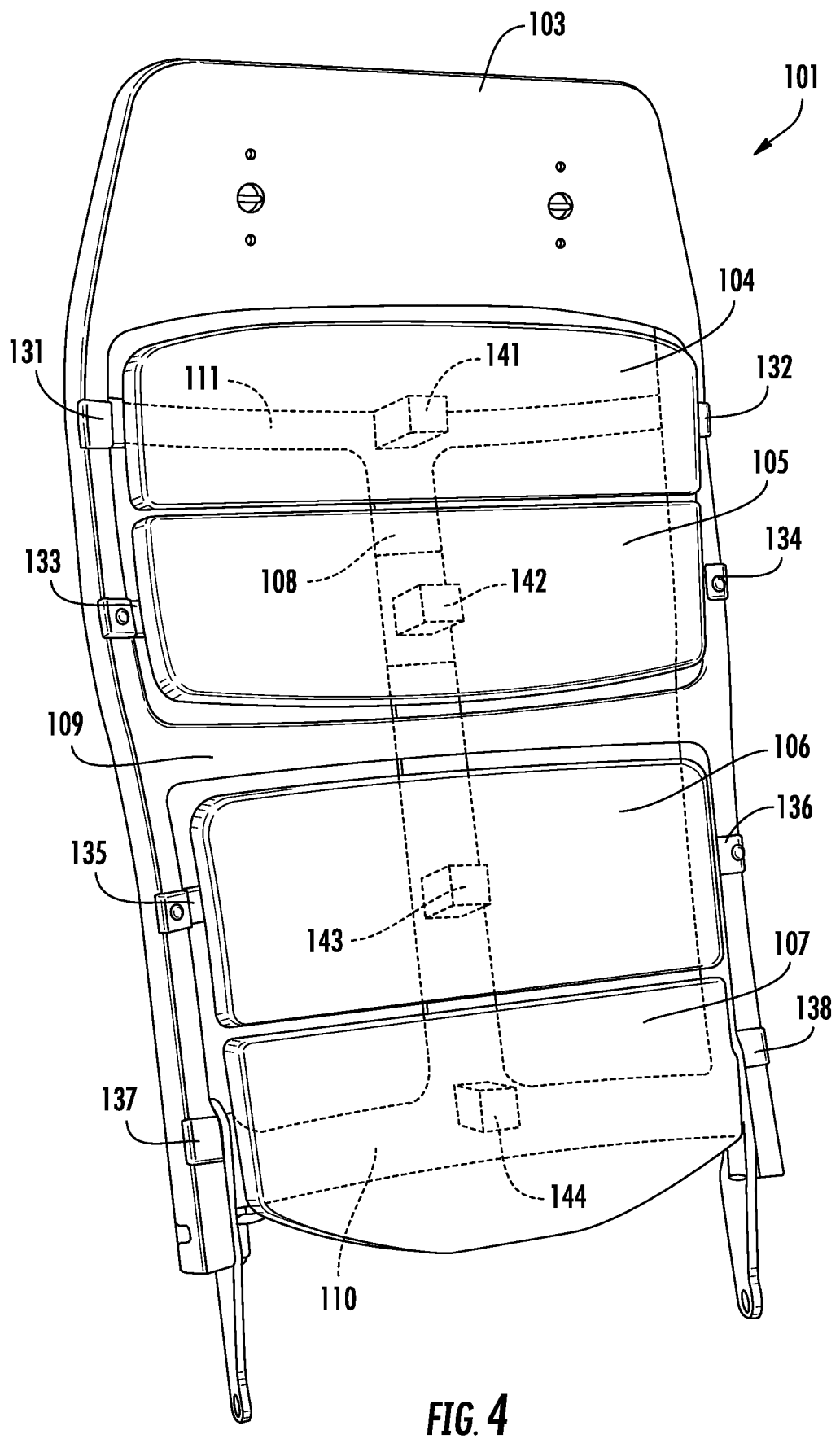
FIG. 4 is a perspective view of a seat back assembly of the passenger seat of FIG. 1.

In some embodiments, as shown in FIG. 4, the seat back assembly 101 may include a rear support structure. The rear support structure may have an "H" or "I" shape. In some embodiments, the rear support structure includes rear support members 108, 110, and 111 (the rear support structure may be a single component, as shown, or may be three or more separate components). The lower rear support member 110 extends between each side of the frame 103. At approximately the center of lower rear support member 110 is an attachment to a lower end of vertical rear support member 108. The upper end of the vertical rear support member 108 attaches to an approximate center of upper rear support member 111. The rear support members 108, 110, and 111 may function provide additional rigidity to the frame 103 and, in some embodiments, also provide mounting provisions for support pads 141, 142, 143, and 144.

Figure 5:
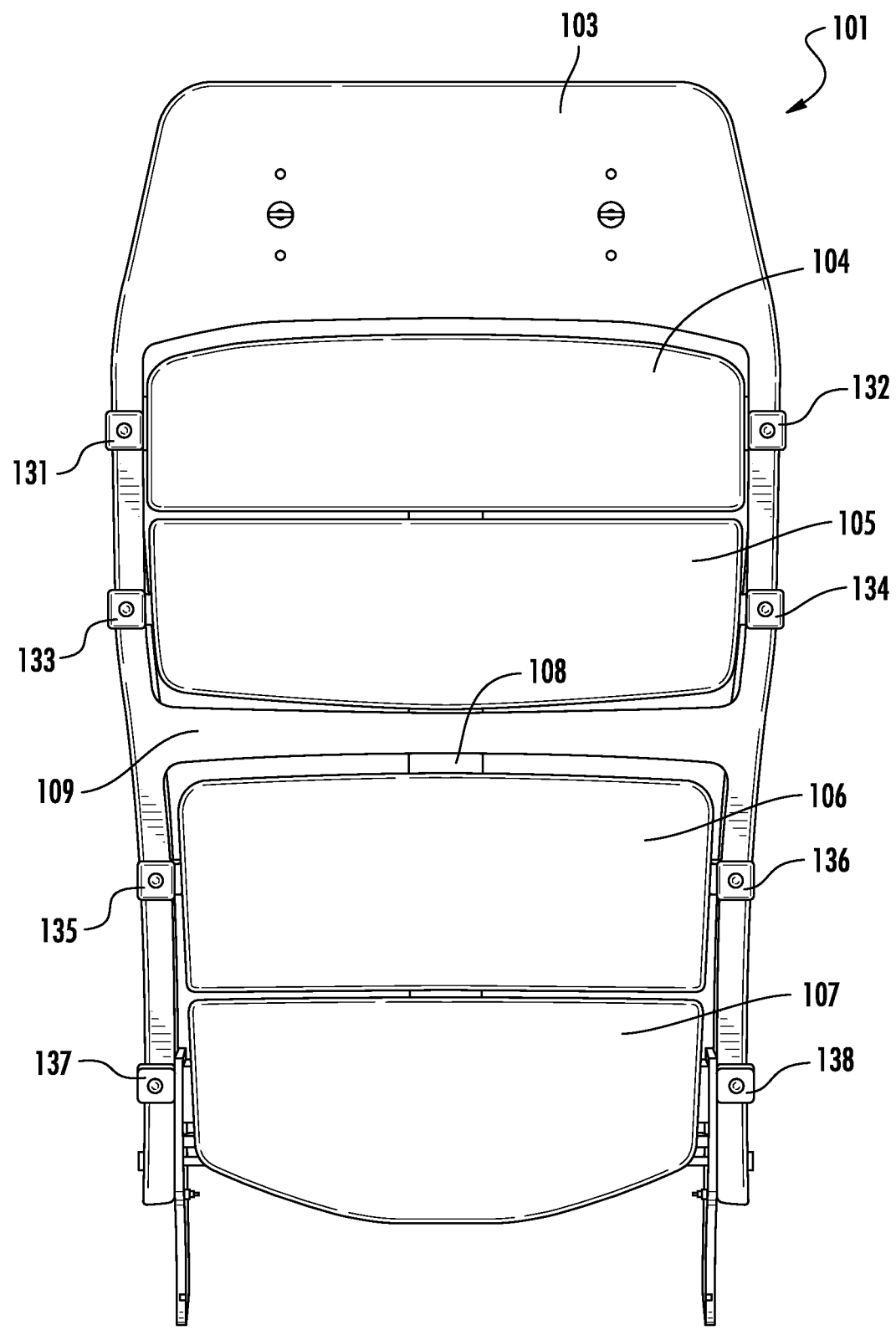
FIG. 5 is a front view of a seat back assembly of the passenger seat of FIG. 1.

The support pads 141, 142, 143, and 144 may each be a spring or may any other configuration (e.g., a box or cylinder shape) spanning between the respective panel and the vertical rear support member 108. The support pads 141, 142, 143, and 144 may comprise flexible material. In some embodiments, the support pads 141, 142, 143, 144 may attach directly to a rear side of the respective panel (104-107). In embodiments that include the attachment member 161, as shown in FIG. 12A, the support pads 141-144 may attach to the respective cross members 162-165 (i.e., not directly to the respective panels 104-107). As shown in FIGS. 4 and 5, in some embodiments that do not include the attachment member 161, each panel (104-107) may attach to side attachment portions 131-138 for connecting the panel to the frame 103. For example, panel 104 may include attachment to support pad 141 and side attachment portions 131 and 132, panel 105 may include attachment to support pad 142 and side attachment portions 133 and 134, panel 106 may include attachment to support pad 143 and side attachment portions 135 and 136, and panel 107 may include attachment to support pad 144 and side attachment portions 137 and 138. The side attachment portions 131-138 may attach to a rear side of the respective panel (104-107) near an adjacent edge of the panel or may extend near the respective support pad (141-144). The side attachment portions 131-138 may comprise flexible or elastic material to ensure the panels are capable of moving or pivoting with respect to the frame 103.

Figure 6:
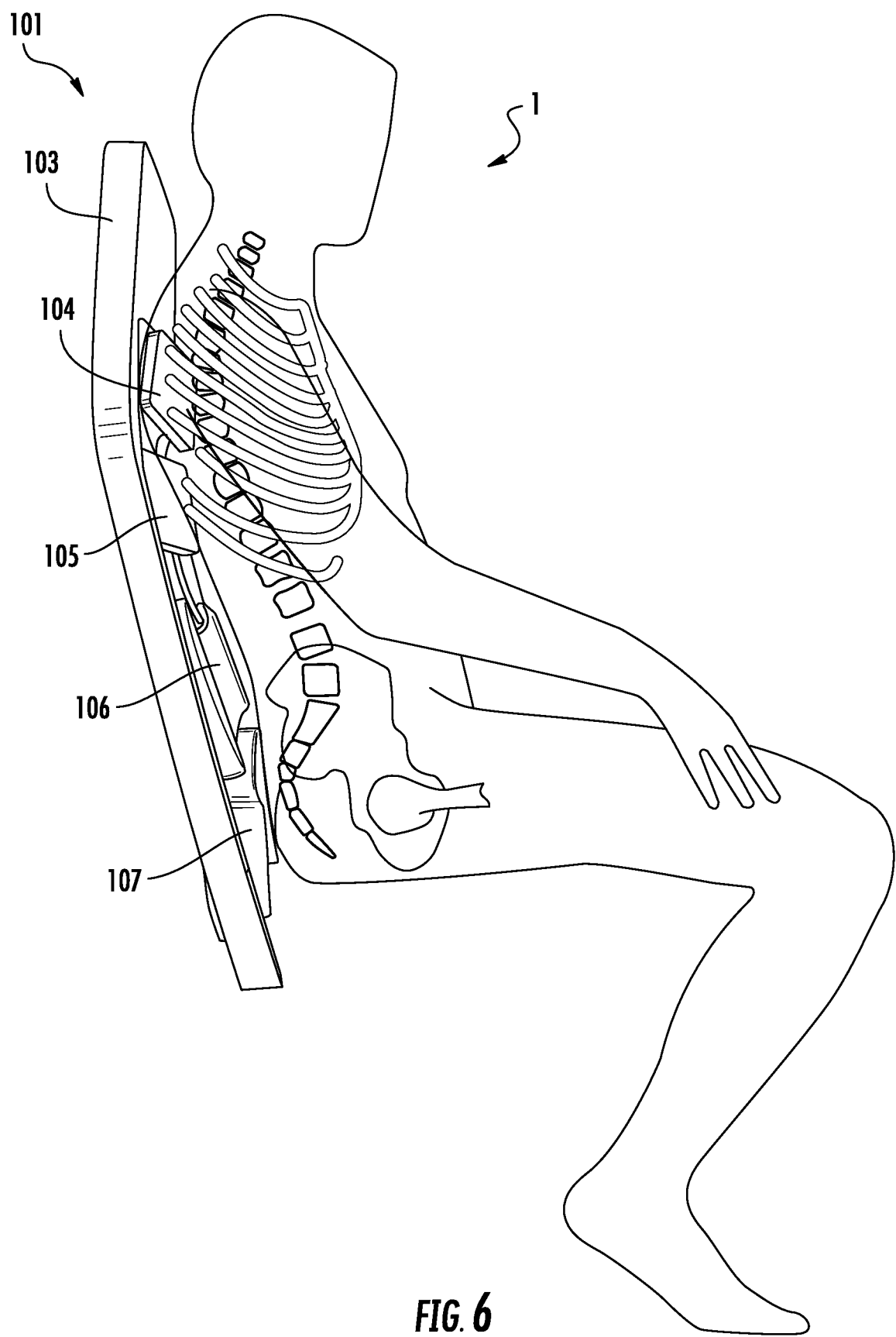
FIG. 6 is a side view of a seat back assembly of the passenger seat of FIG. 1.
Figure 13:
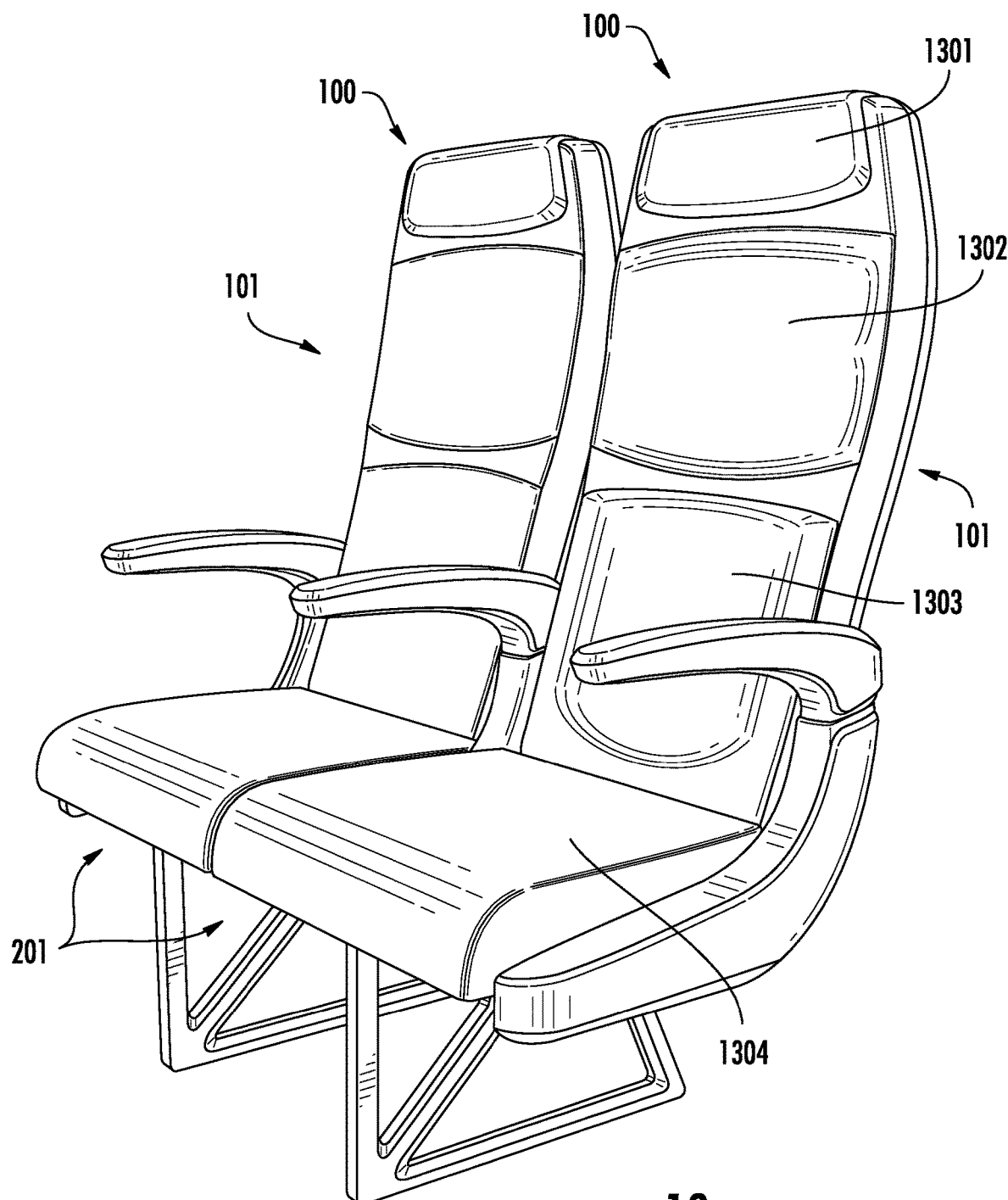
FIG. 13 is a perspective view of the passenger seat of FIG. 1.

As shown in FIG. 6, the seat back assembly 101 may adapt to the shape and position of a passenger 1. For example, for some passengers 1, upper portion of the frame 103 (which may include a padded area and headrest 1301 as shown in FIG. 13) conforms to the shape and position of the passenger's cervical spine 2. The first and second panels 104 and 105 may adapt to the thoracic spine 3 (these panels may span areas supporting the cervical spine 2 and/or the lumbar spine 4). As shown in FIG. 6, panel 106 may be disposed adjacent to a passenger's lumbar spine 4 (and may span areas supporting the thoracic spine 3 and/or the sacrum 5). Panel 107 may be disposed adjacent to a passenger's sacrum 5 (and may span areas supporting the lumbar spine 4).

Figure 7:
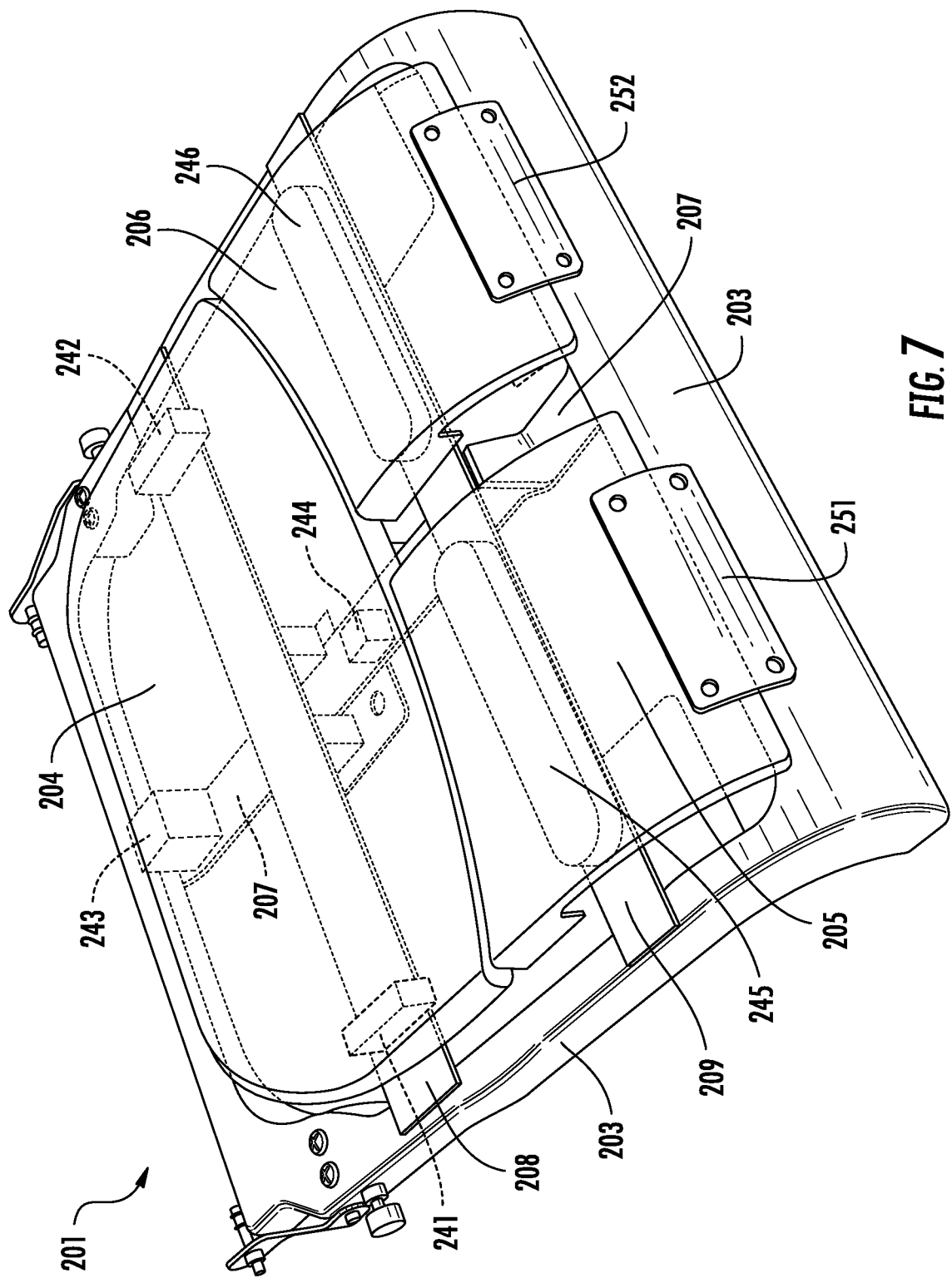
FIG. 7 is a perspective view of a seat bottom assembly of the passenger seat of FIG. 1.
Figure 8:
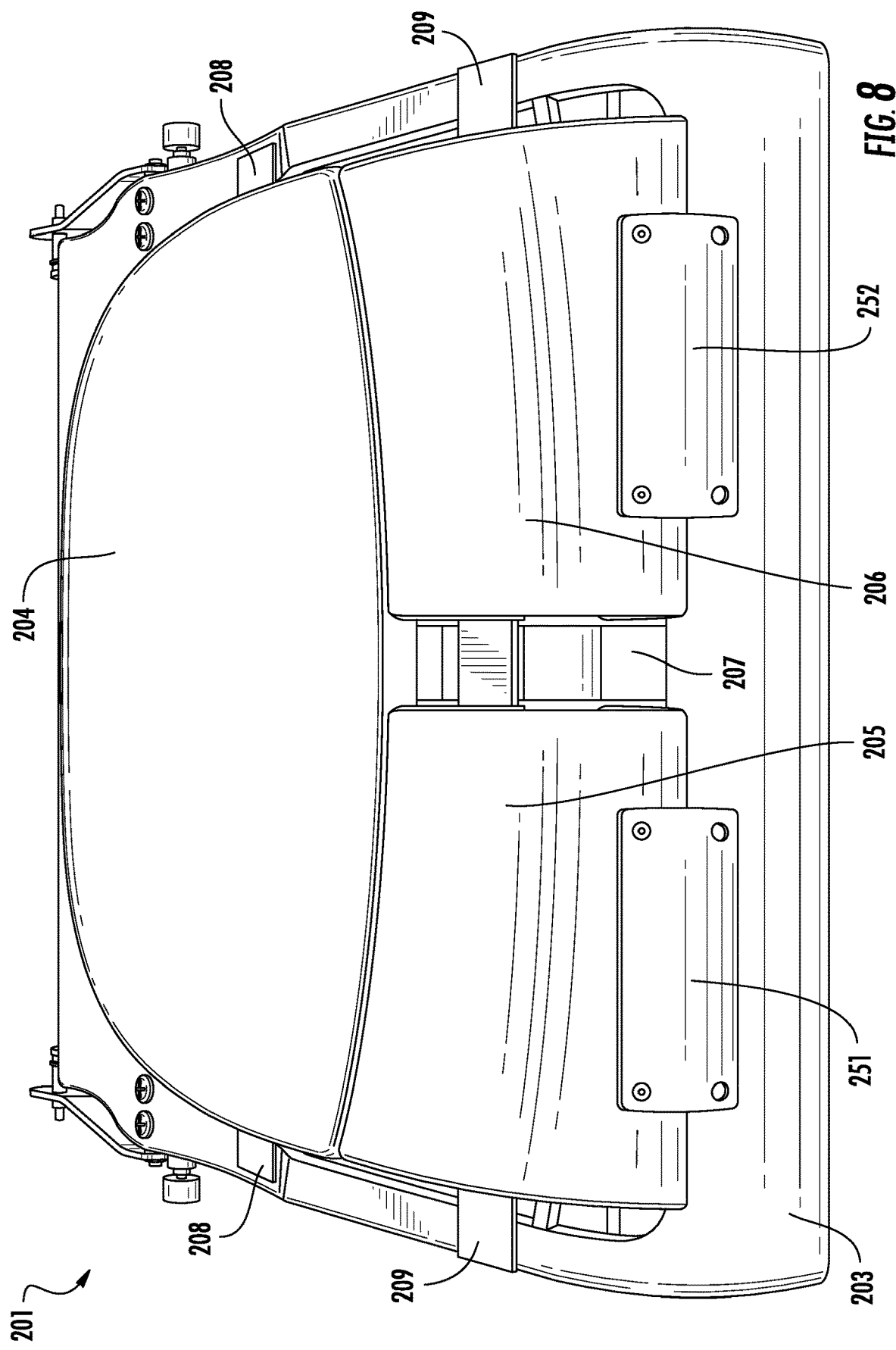
FIG. 8 is a perspective view of a seat bottom assembly of the passenger seat of FIG. 1.

In some embodiments, as shown in FIG. 7, the seat bottom assembly 201 may include a longitudinal support member 207, a rear support member 208, and a front support member 209. The front and rear support members 209, 208 extend between each side of the frame 203. At approximately the center of the rear side of the frame 203 is an attachment to a rear end of the longitudinal support member 207 and at approximately the center of the front side of the frame 203 is an attachment to a front end of the longitudinal support member 207. The longitudinal support member 207, the rear support member 208, and a front support member 209 may function provide additional rigidity to the frame 203 and, in some embodiments, also provides mounting provisions for support pads 241, 242, 243, 244, and 245.

The support pads 241-245 may each be a spring or may any other configuration (e.g., a box or cylinder shape) spanning between the respective panel and the support member. The support pads 241, 242, 243, 244, and 245 may comprise flexible material. In some embodiments, the support pads 241, 242, 243, 244, and 245 may attach directly to a rear side of the respective panel (204-206). As shown in FIG. 7, in some embodiments, each panel (204-206) may include multiple attachment or support portions for connecting the panel to the frame 203. For example, panel 204 may include attachment to support pads 241, 242, 243, and 244; panel 205 may include attachment to support pad 245 and bracket 251; and panel 206 may include attachment to support pad 246 and bracket 252. The support pads 245 and 246 for the front leg panels 205 and 206, respectively, span a majority of the width of each leg panel and, in some cases, nearly the full width of the panels (approximately 90% of the width of the panels).

Figure 9:
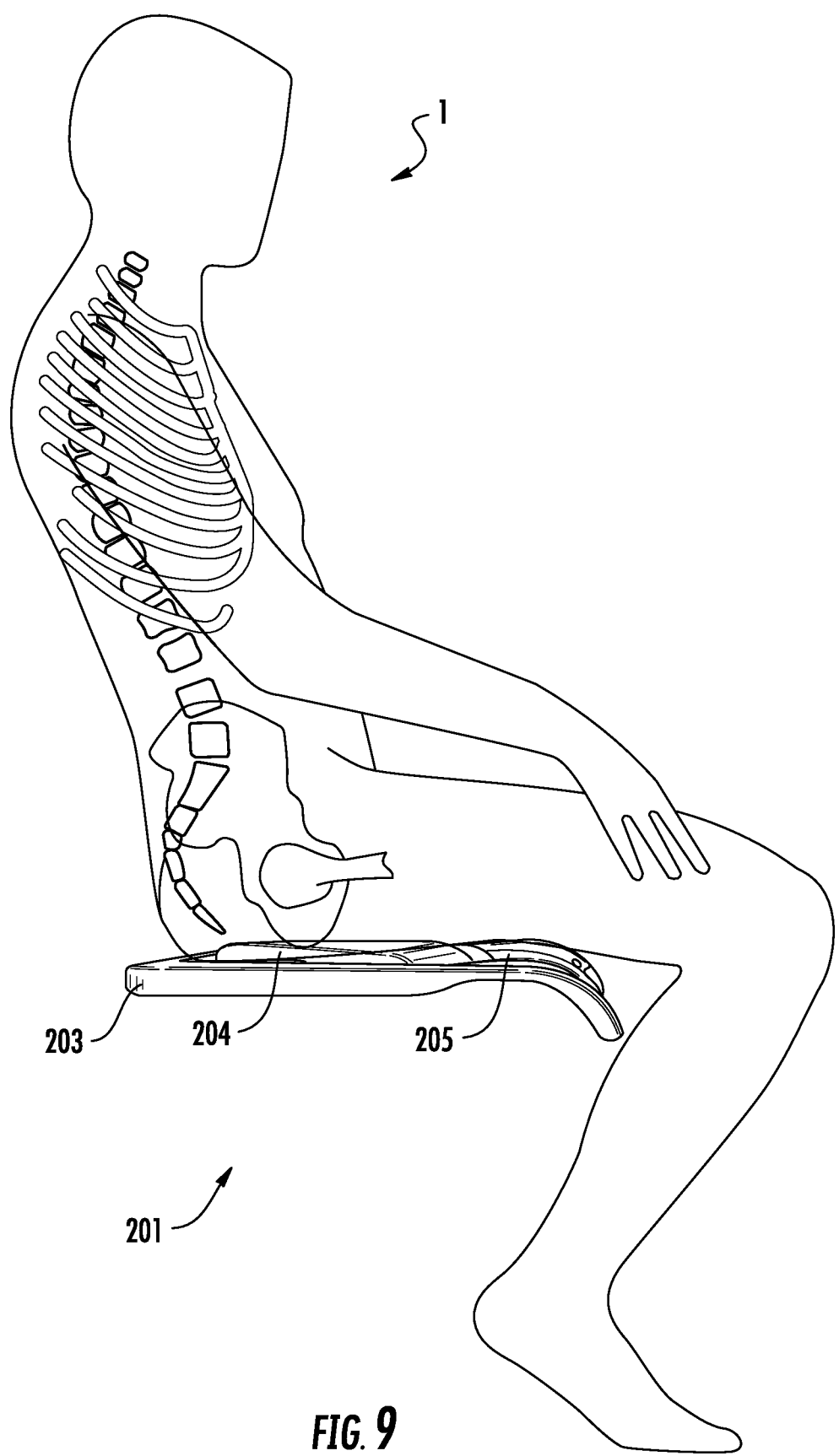
FIG. 9 is a side view of a seat bottom assembly of the passenger seat of FIG. 1.

As shown in FIG. 7, the support pads 241 and 242 may attach to the rear support member 208. Similarly, the support pads 243 and 244 may attach to the longitudinal support member 207. Support pads 245 and 246 may attach to the front support member 209. The support pads 241-246 may comprise flexible or elastic material such that the support pads are capable of compressing (in one or more directions) to allow the panels 204-206 to move or pivot with respect to the frame 203. For example, panel 204 may move down under the weight of passenger 1 where support pads 241-244 all compress an approximately equal magnitude. If the passenger 1 leans back and/or centers her weight closer to a rear side of the panel 204, support pad 245 may compress more than the other support pads. In addition, for such a condition, support pad 246 may maintain a constant shape/size, may compress (less than support pad 245), or may stretch/expand. Simultaneously, the panel 204 may pivot about support pads 243 and 244 where a rear portion of each of the support pads 243 and 244 compresses while a forward portion of the support pads 243 and 244 either stretches/expands or compresses with a reduced magnitude (compared to the rear portions). As shown in FIG. 9, the seat bottom assembly 201 may adapt to the shape and position of a passenger 1.

The brackets 251 and 252 (see FIGS. 7 and 8) are configured to limit the maximum rotation of the two forward leg panels 205 and 206 about a lateral axis (i.e., an axis parallel to the longitudinal direction of front support member 209). For example, the frame 203 may include slotted holes for interfacing with brackets 251 and 252 such that the slots allow the brackets 251 and 252 to move within predetermined ranges in the forward/aft direction (i.e., parallel to the longitudinal direction of longitudinal support member 207).

Figure 11A:
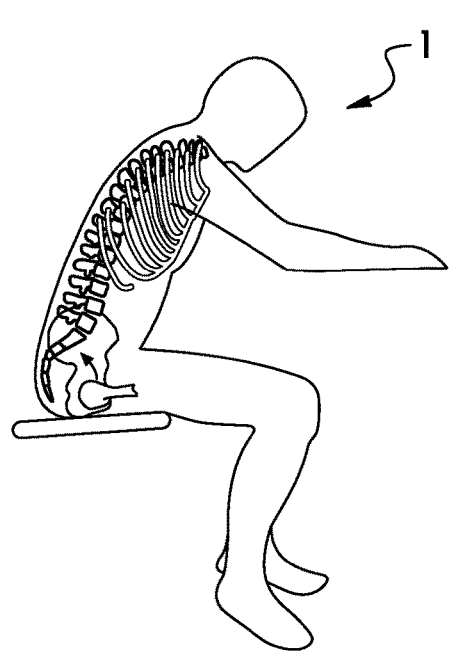
FIGS. 11A, 11B, 11C, and 11D are side views of various passenger postures according to certain embodiments of the present invention.
Figure 11B:
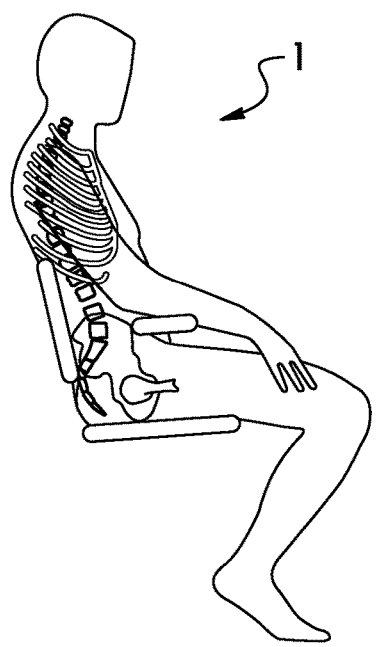
Figure 11C:
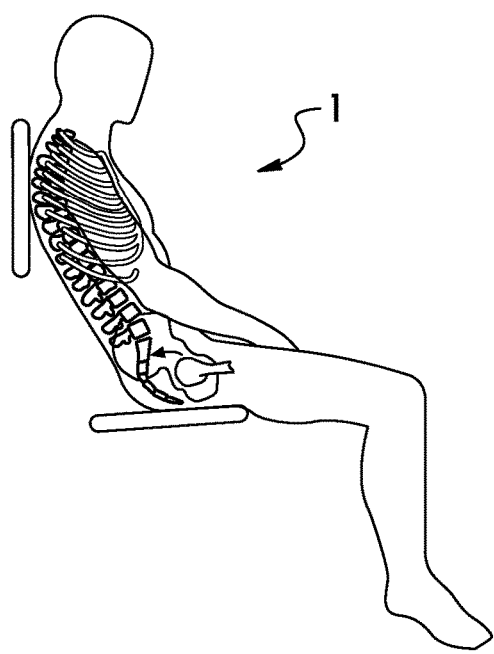

FIGS. 10A-10D show examples of different positions of the various panels of the seat back assembly 101 and the seat bottom assembly 201. For example, FIG. 10A shows panel 104 in a first position 104a, panel 105 in a first position 105a, panel 106 in a first position 106a, and panel 107 in a first position 107a. FIG. 10B shows a second possible position for each panel including panel 104 in a second position 104b, panel 105 in a second position 105b, panel 106 in a second position 106b, and panel 107 in a second position 107b. One example of a position for a passenger 1 that results in panel positions shown in FIG. 10A is shown in FIG. 11B. One example of a position for a passenger 1 that results in panel positions shown in FIG. 10B is shown in FIG. 11C.

FIG. 10C shows panel 204 in a first position 204a, panel 205 in a first position 205a, and panel 206 in a first position 206a. FIG. 10D shows a second possible position for each panel including panel 204 in a second position 204b, panel 205 in a second position 205b, and panel 206 in a second position 206b. One example of a position for a passenger 1 that results in panel positions shown in FIG. 10C is shown in FIG. 11B. One example of a position for a passenger 1 that results in panel positions shown in FIG. 10D is shown in FIG. 11C.

Figure 12B:
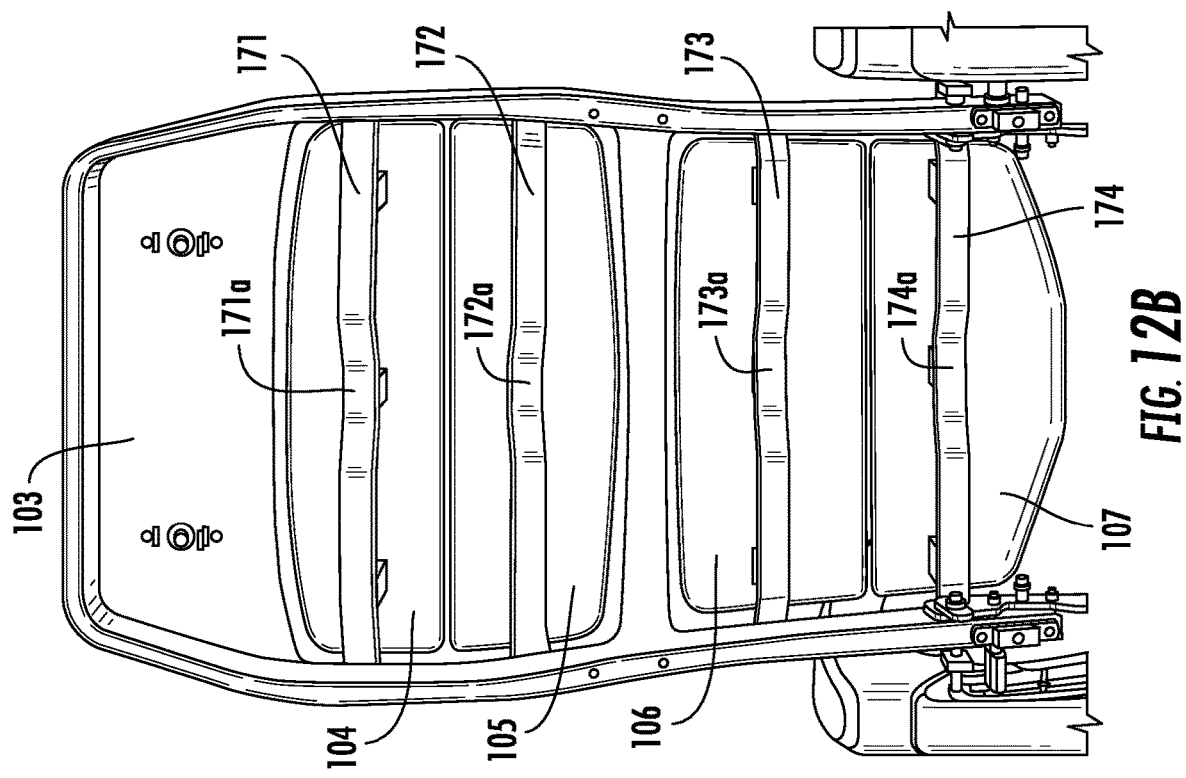
FIGS. 12A and 12B are rear views of a seat back assemblies according to certain embodiments of the present invention.
Figure 12A:
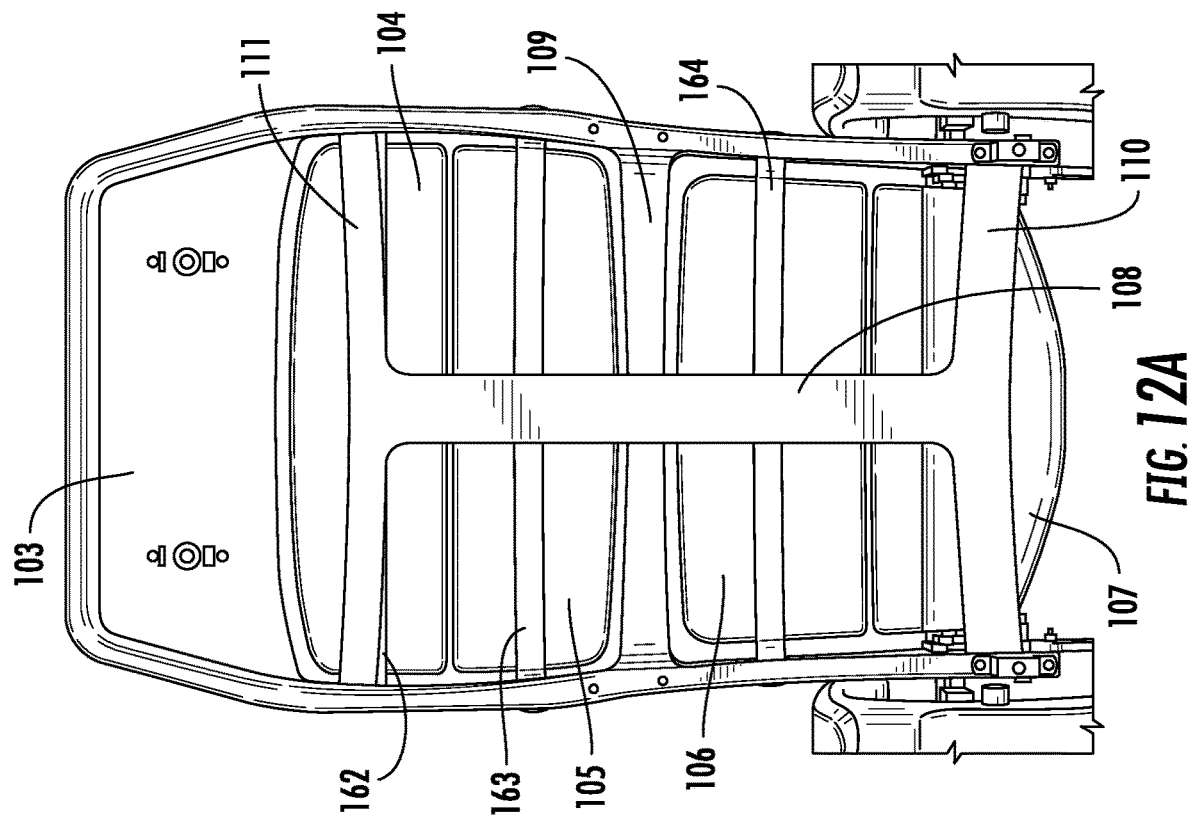

In some embodiments, as shown in FIG. 12B, the seat back assembly 101 may include a structure that does not include the rear support structure (i.e., rear support members 108, 110, and 111). As shown in FIG. 12B, the seat back assembly 101 may include a lateral structural member for each panel. For example, panel 104 is supported by lateral structural member 171, panel 105 is supported by lateral structural member 172, panel 106 is supported by lateral structural member 173, and panel 107 is supported by lateral structural member 174. Each of the lateral structural members includes a central support portion that protrudes toward the respective panel and includes a flat area (171a, 172a, 173a, and 174a).

Figure 14:
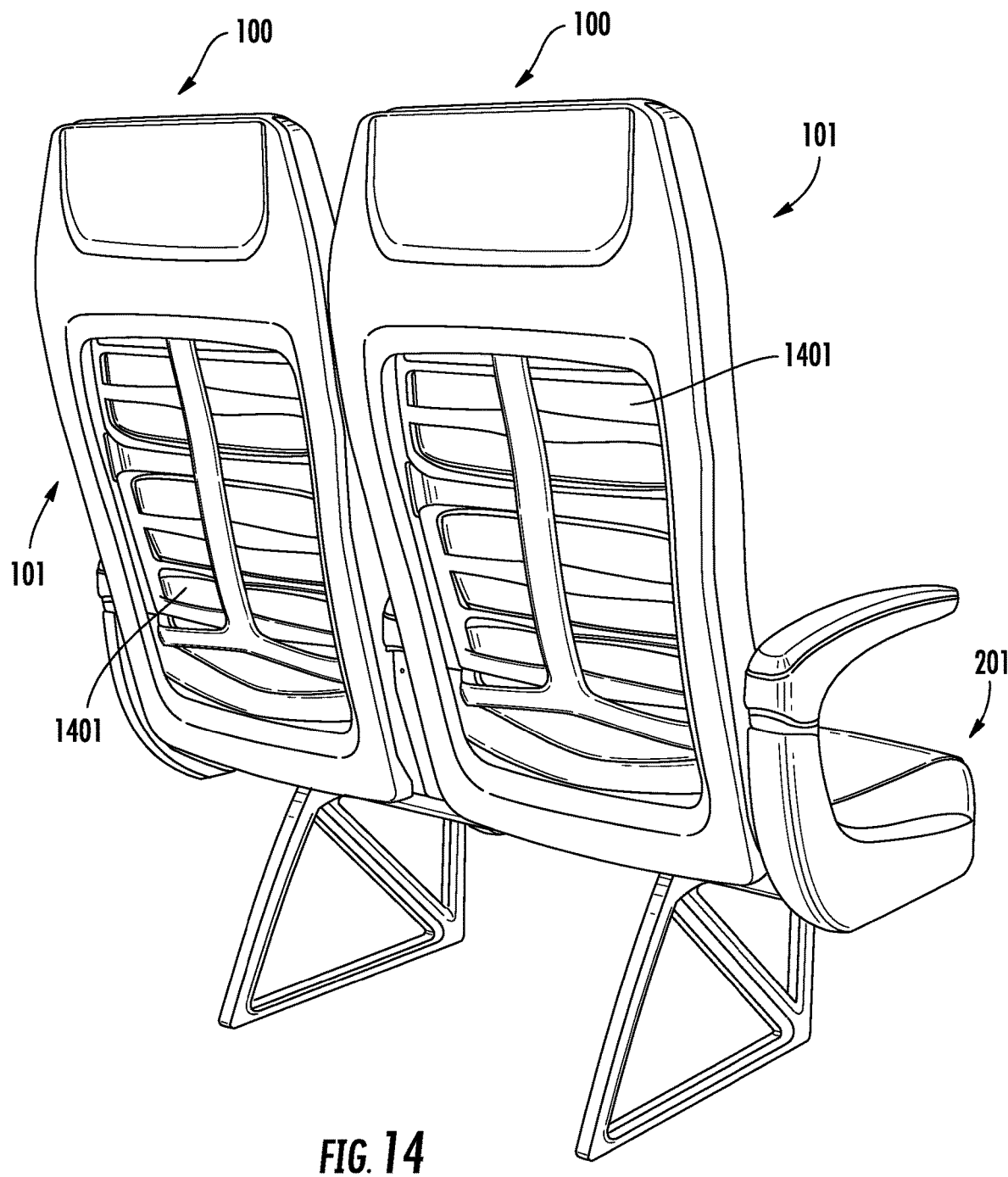
FIG. 14 is a perspective view of the passenger seat of FIG. 1.

FIG. 13 illustrates seat 100 with padded outer coverings. For example, the seat back assembly 101 includes a headrest 1301 covering the upper portion of frame 103, an upper padded area 1302 covering the first and second panels 104 and 105, and a lower padded area 1303 covering the third and fourth panels 106 and 107. The seat bottom assembly 201 includes padded covering 1304. As shown in FIG. 14, the rear side of seat 100 may include a window 1401, where window 1401 may include a transparency and/or an opening.

Figure 15:
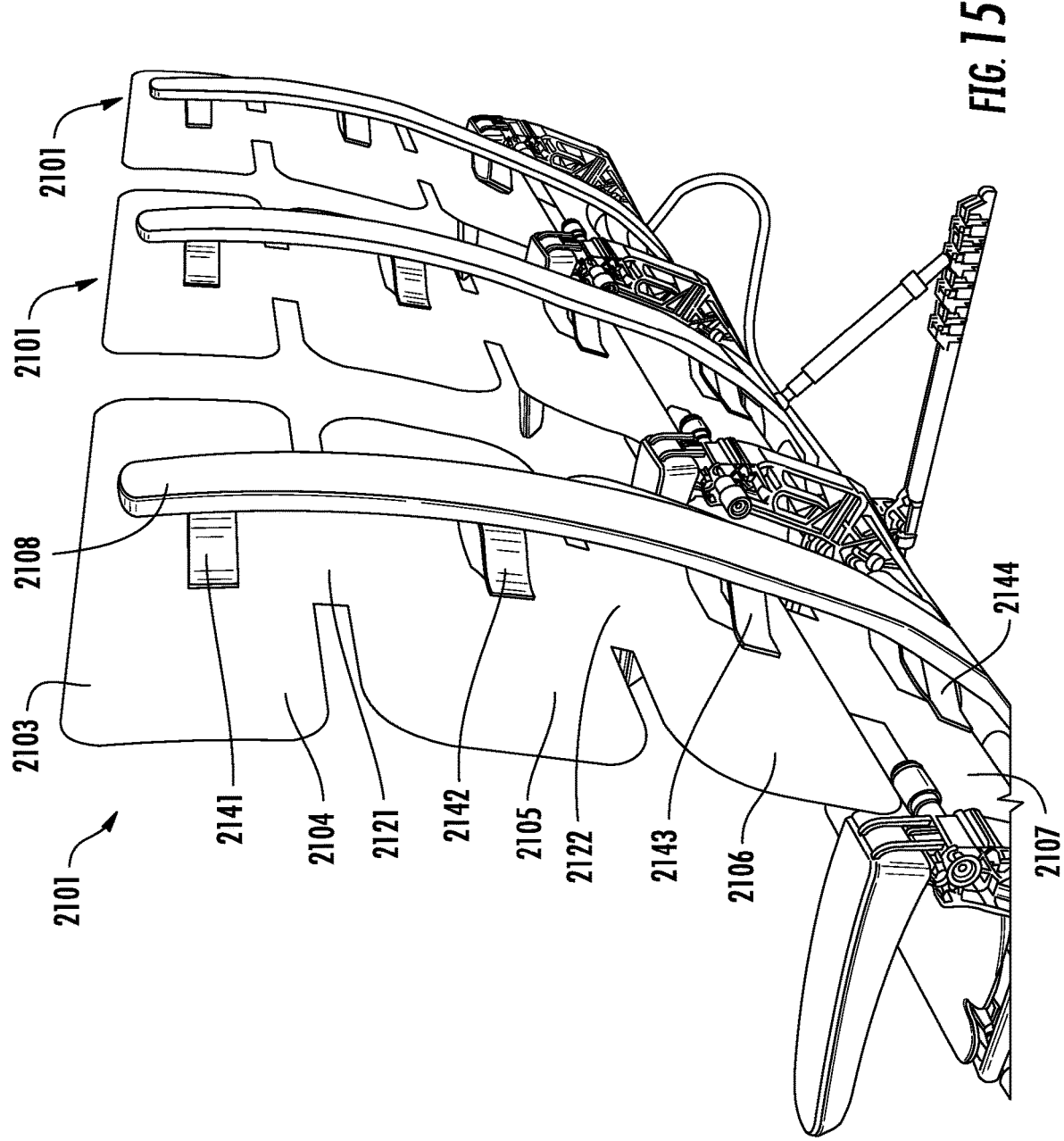
FIG. 15 is a perspective view of a passenger seat according to certain embodiments of the present invention.
Figure 16:
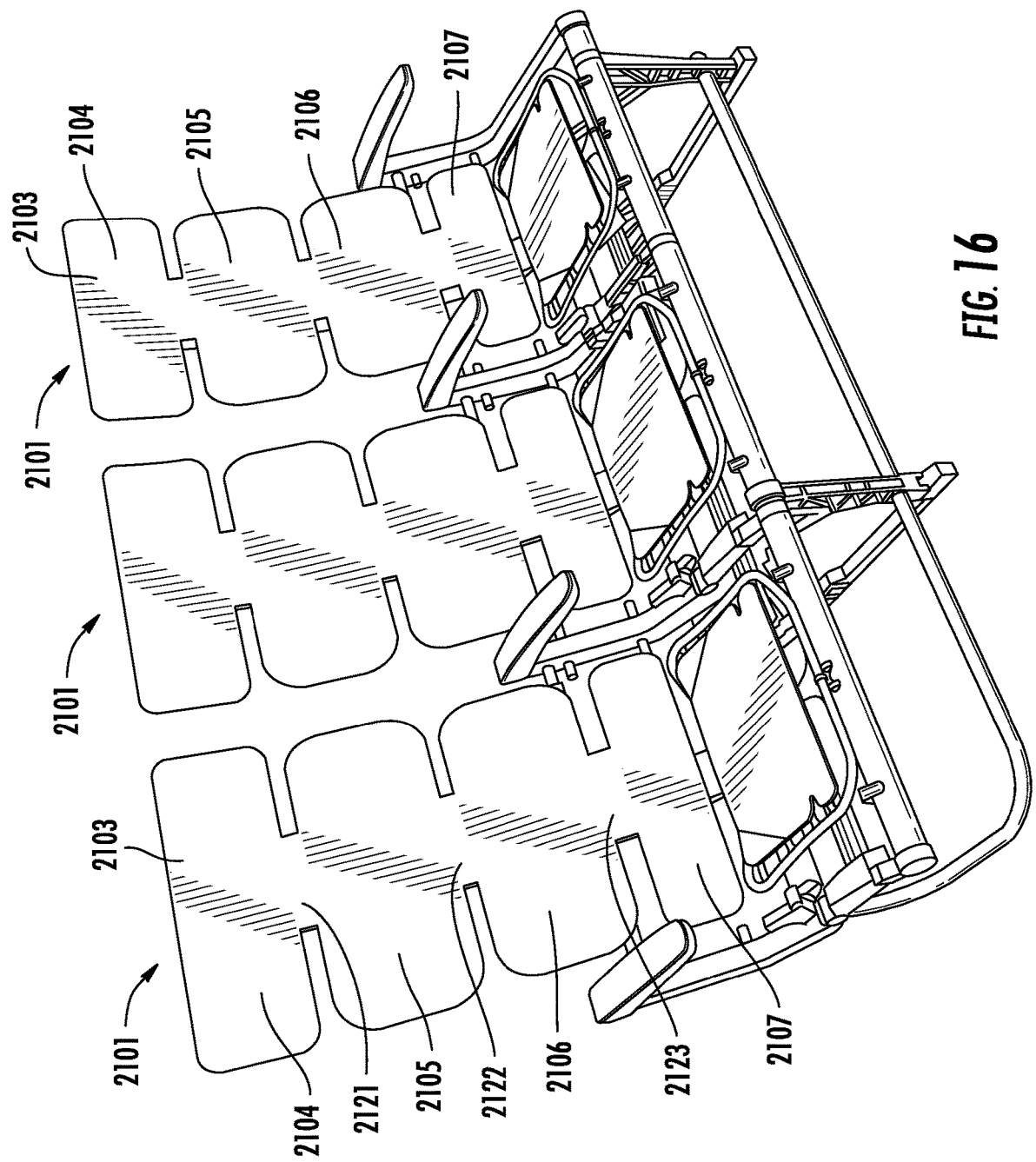
FIG. 16 is a perspective view of the passenger seat of FIG. 15.

As shown in FIGS. 15 and 16, in some embodiments, the seat back assembly 2101 includes a seat panel structure 2103 that includes a first panel 2104, a second panel 2105, a third panel 2106, and a fourth panel 2107 where the panels are attached to a rear spine member 2108. Although FIGS. 15 and 16 show four panels, the seat back assembly 2101 may include any number of panels. In some embodiments, the panels 2104-2107 attached to the spine member 2108 by suspension members 2141-2144. For example, first panel 2104 is attached to first suspension member 2141, second panel 2105 is attached to second suspension member 2142, third panel 2106 is attached to third suspension member 2143, and fourth panel 2107 is attached to fourth suspension member 2144. The suspension members 2141-2144 may each be a spring or may any other configuration (e.g., a box or cylinder shape) spanning between the respective panel and the spine member 2108. For example, in some embodiments, the suspension members 2141-2144 may be leaf springs.

The panels (2104-2107) may be connected to one another (as shown in FIGS. 15 and 16) or may be separate from one another. In some embodiments, the panels (2104-2107) are connected to one another by connection members 2121, 2122, and 2123. The connection members 2121-2123 may be continuous members with similar material and cross-section as the adjacent panels or, in some embodiments, the connection members 2121-2123 may be configured with increased flexibility to promote independent movement of each individual panel. For example, the connection members 2121-2123 may each include a hinge, a portion with decreased thickness, a portion with smaller cross-sectional area, a different (e.g., more flexible) material, or any other characteristic that enhances flexibility.

Figure 17:
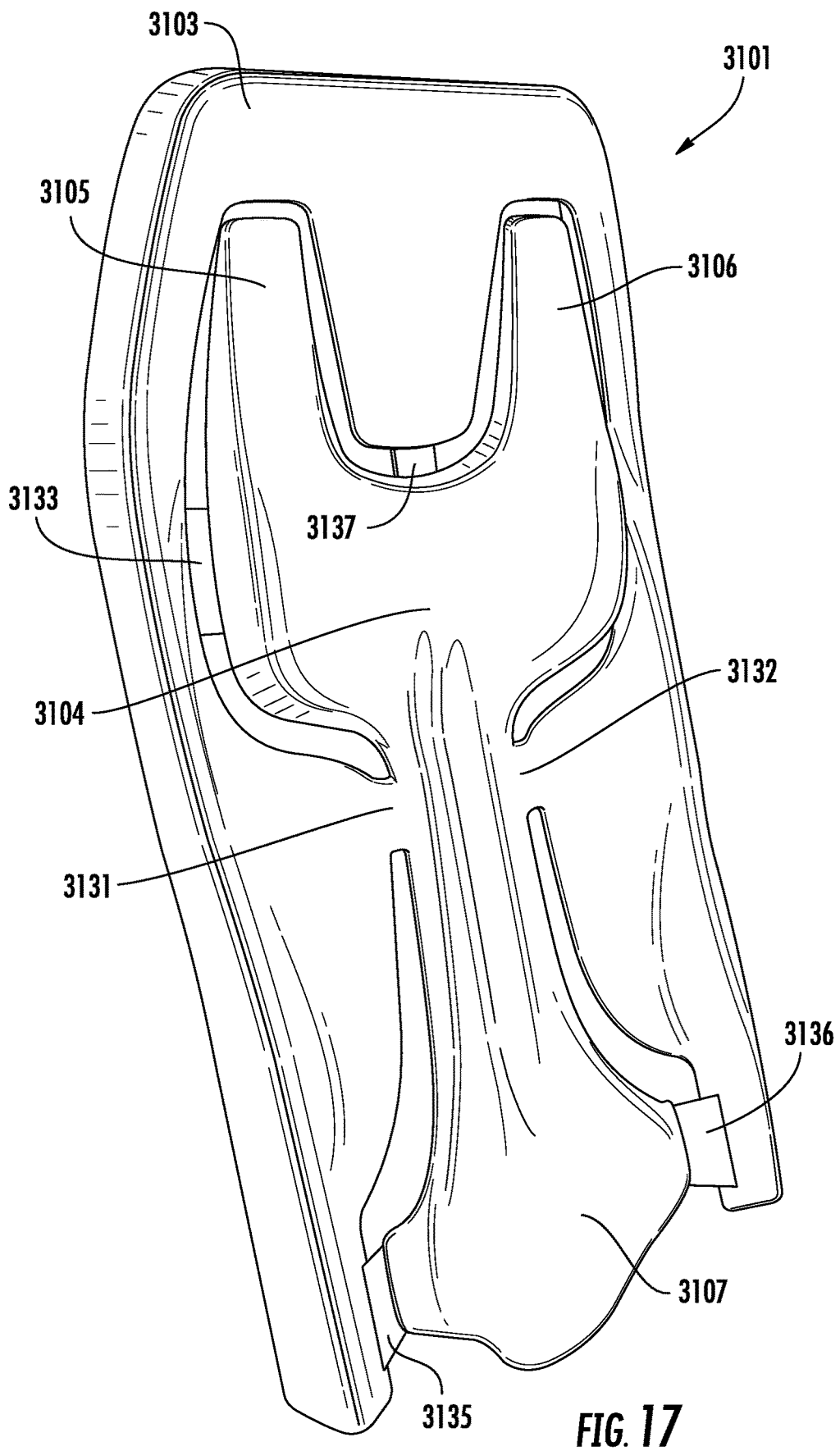
FIG. 17 is a perspective view of a passenger seat according to certain embodiments of the present invention.

In some embodiments, the seat back assembly 3101 (see FIGS. 17, 18A, and 18B) may include a movable panel 3104 and a frame 3103. The panel 3104 may include upper portions 3105 and 3106, which are configured to move with and/or support the passenger 1's shoulders, and a lower portion 3107. As shown in FIG. 17, the panel 3104 may be attached to the frame 3103 with one or more attachment members. For example, the seat back assembly 3101 may include center left attachment 3131, center right attachment 3132, upper left attachment 3133 (the upper right attachment is not visible in the illustrated views but would be approximately a mirror image of upper left attachment 3133), lower left attachment 3135, lower right attachment 3136, and a middle attachment 3137. The attachments 3131-3137 may comprise flexible or elastic material to ensure the panel 3104 is capable of moving or pivoting with respect to the frame 3103.

Figure 11D:
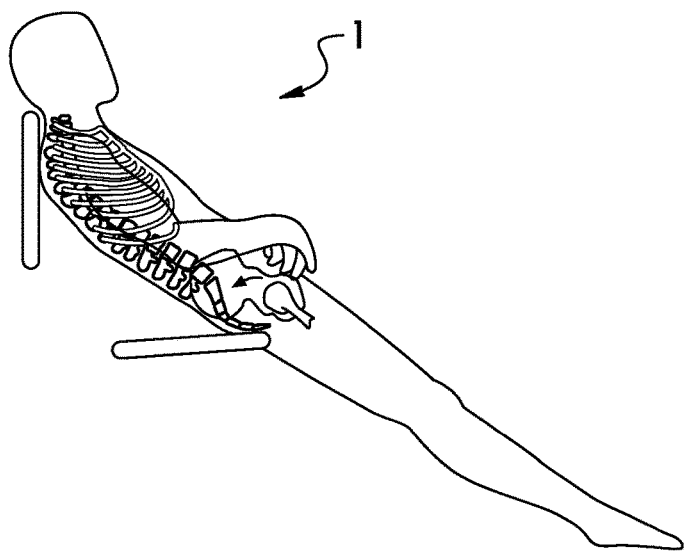
Figure 18A:
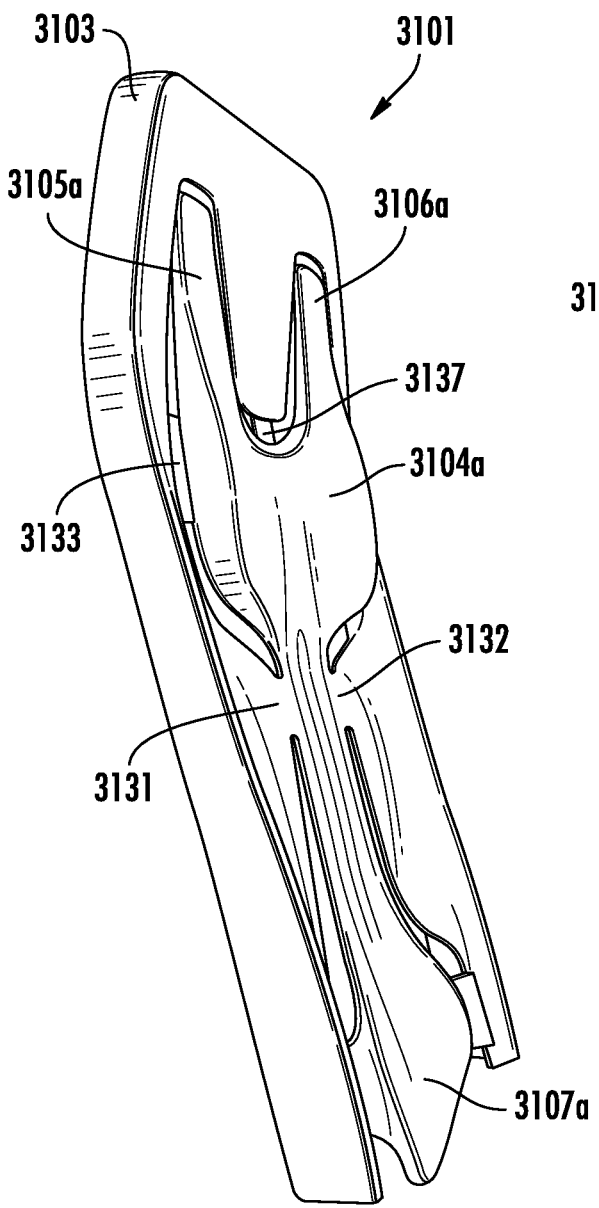
FIGS. 18A and 18B are perspective views of the passenger seat of FIG. 17.
Figure 18B:
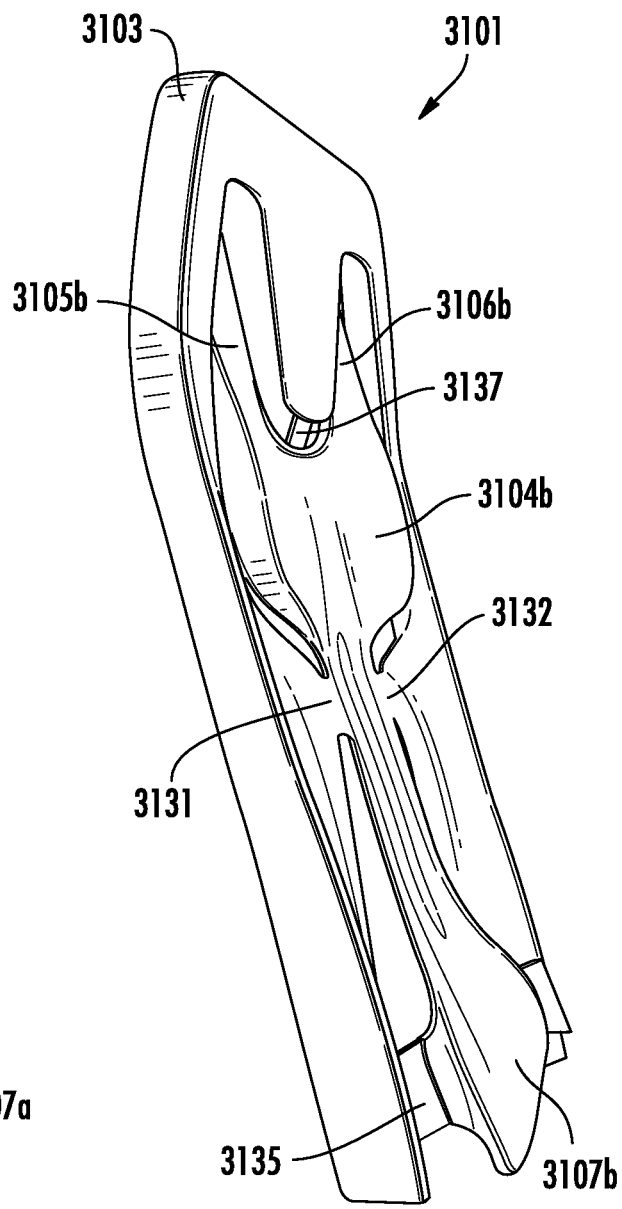

FIGS. 18A and 18B show examples of different positions of the panel 3104 of the seat back assembly 3101. For example, FIG. 18A shows upper left portion 3105 in a first position 3105a, upper right portion 3106 in a first position 3106a, and lower portion 3107 in a first position 3107a. FIG. 18B shows a second possible position for each portion of panel 3104 including upper left portion 3105 in a second position 3105b, upper right portion 3106 in a second position 3106b, and lower portion 3107 in a second position 3107b. One example of a position for a passenger 1 that results in panel positions shown in FIG. 18A is shown in FIG. 11B. Two examples of positions for a passenger 1 that result in panel positions shown in FIG. 18B are shown in FIGS. 11C and 11D.

Figure 19:
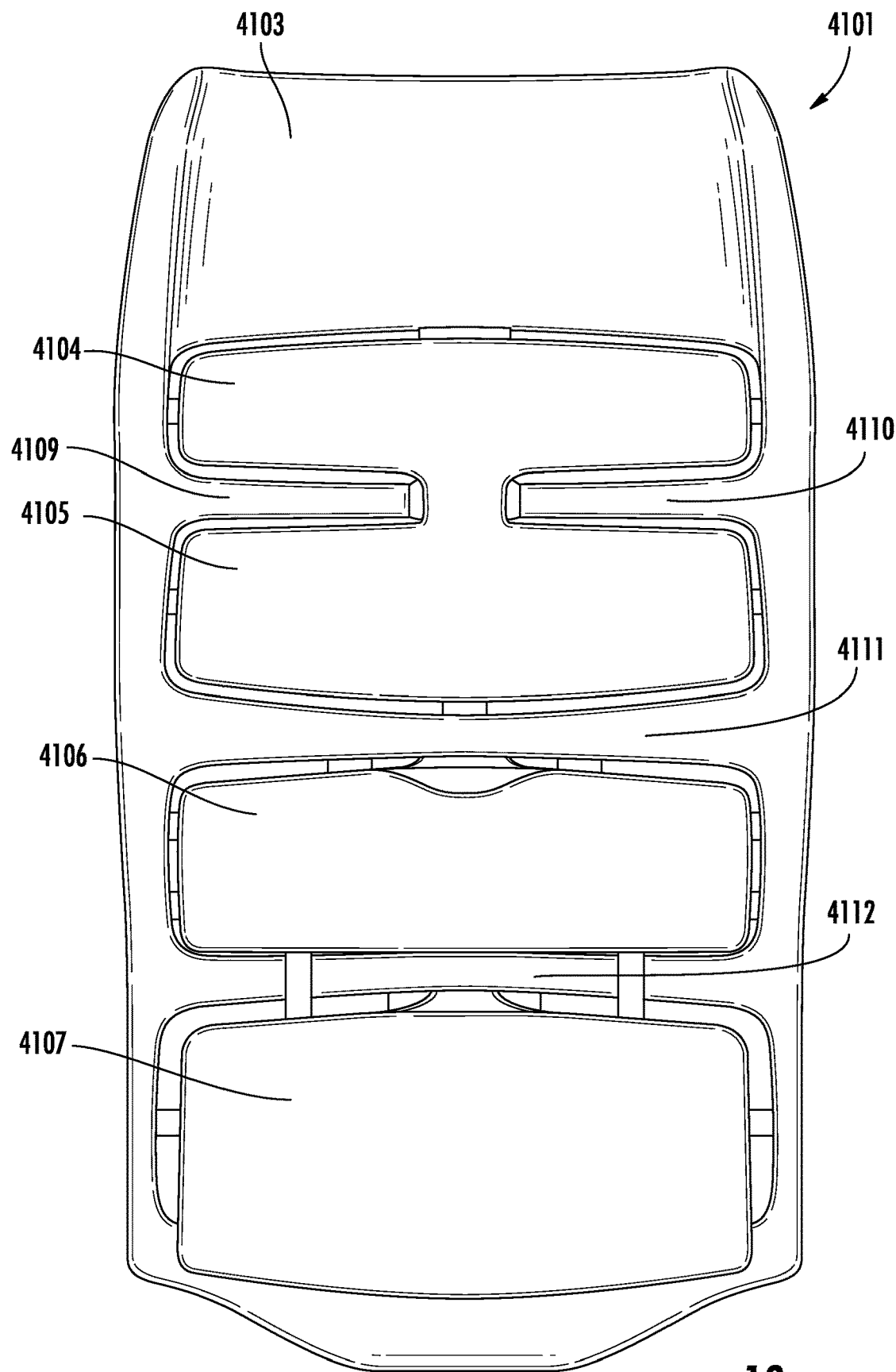
FIG. 19 is a front view of a passenger seat according to certain embodiments of the present invention.
Figure 20:
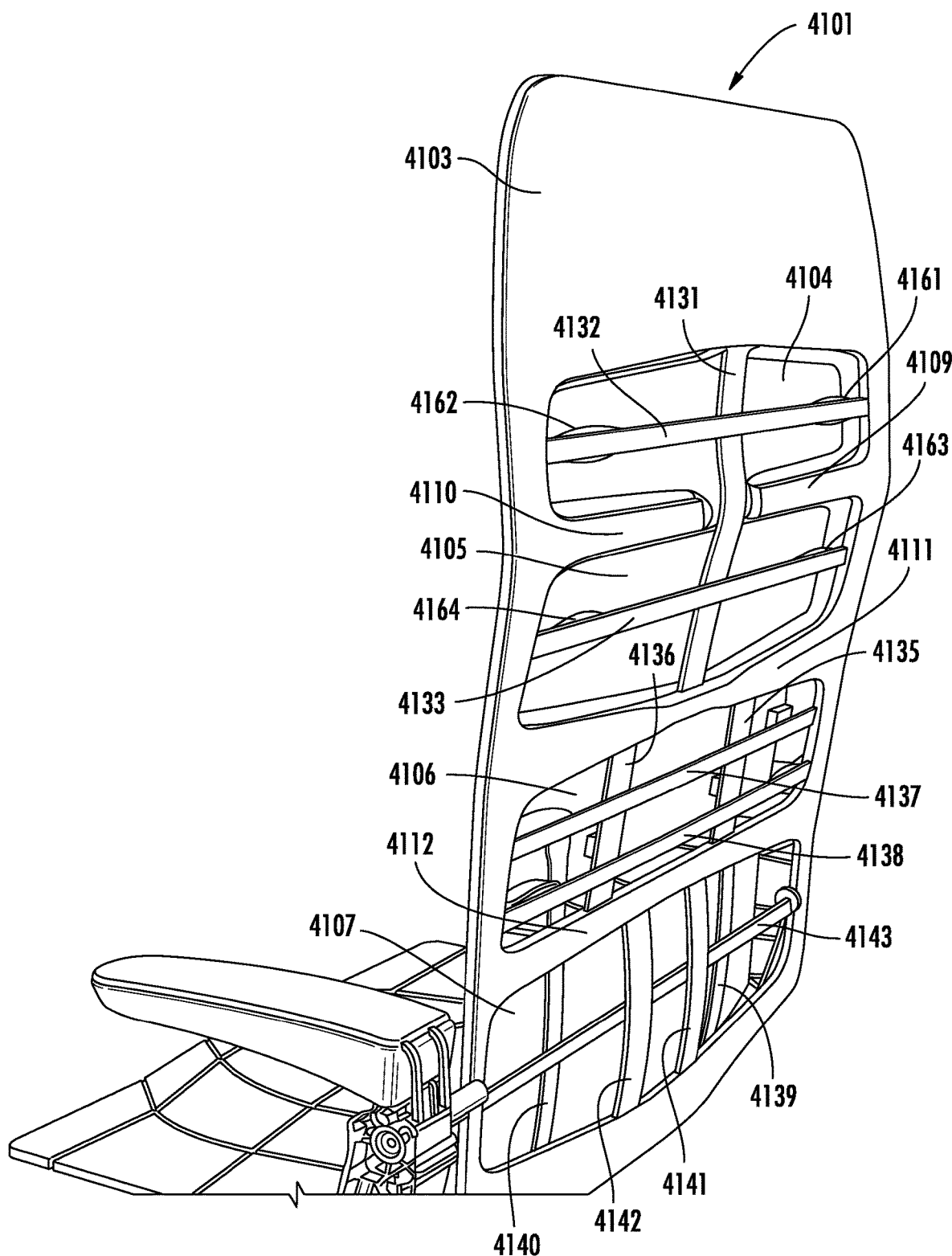
FIG. 20 is a perspective view of the passenger seat of FIG. 19.

In some embodiments, as shown in FIGS. 19 and 20, the seat back assembly 4101 may include a frame 4103, a first panel 4104, a second panel 4105, a third panel 4106, and a fourth panel 4107 where the panels are attached to a rear support system. In some embodiments, the first panel 4104 and the second panel 4105 are attached to one another (see FIG. 19) although there may be other embodiments where these panels are not attached to one another. In embodiments where the first panel 4104 and the second panel 4105 are attached to one another, the frame 4103 may include cantilevered members 4109 and 4110. The frame 4103 may also include cross member 4111 (disposed between second panel 4105 and third panel 4106) and cross member 4112 (disposed between third panel 4106 and fourth panel 4107).

The rear support system may include a vertical member 4131 that extends across the first panel 4104 and the second panel 4105. Horizontal members 4132 and 4133 may extend across the first panel 4104 and the second panel 4105, respectively. The third panel 4106 and the fourth panel 4107 may include more members. For example, the rear support system adjacent to the third panel 4106 may include a left vertical member 4135, a right vertical member 4136, an upper horizontal member 4137, and a lower horizontal member 4138. The rear support system adjacent to the fourth panel 4107 may include a left outer vertical member 4139, a right outer vertical member 4140, a left inner vertical member 4141, a right inner vertical member 4142, and a horizontal member 4143. In some embodiments, the members 4131-4143 may attach directly to a rear side of the respective panel (4104-4107). In some embodiments, some or all of the members 4131-4143 may attach to a support pad. For example, horizontal member 4132 may attach to support pads 4161 and 4162 and horizontal member 4133 may attach to support pads 4163 and 4164. Although not illustrated, any of the members 4131-4143 (or none of the members 4131-4143) may include support pads for attaching the panels 4104-4107. The support pads may comprise flexible material.

Figure 21A:
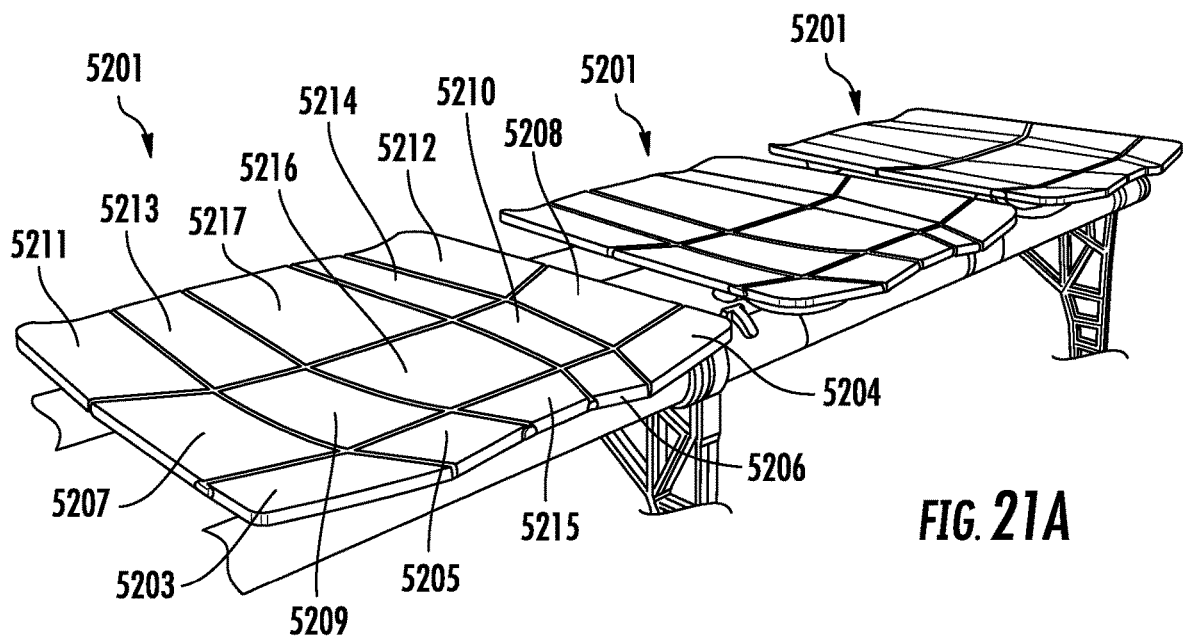
FIG. 21A is a perspective view of a passenger seat according to certain embodiments of the present invention.
Figure 21B:
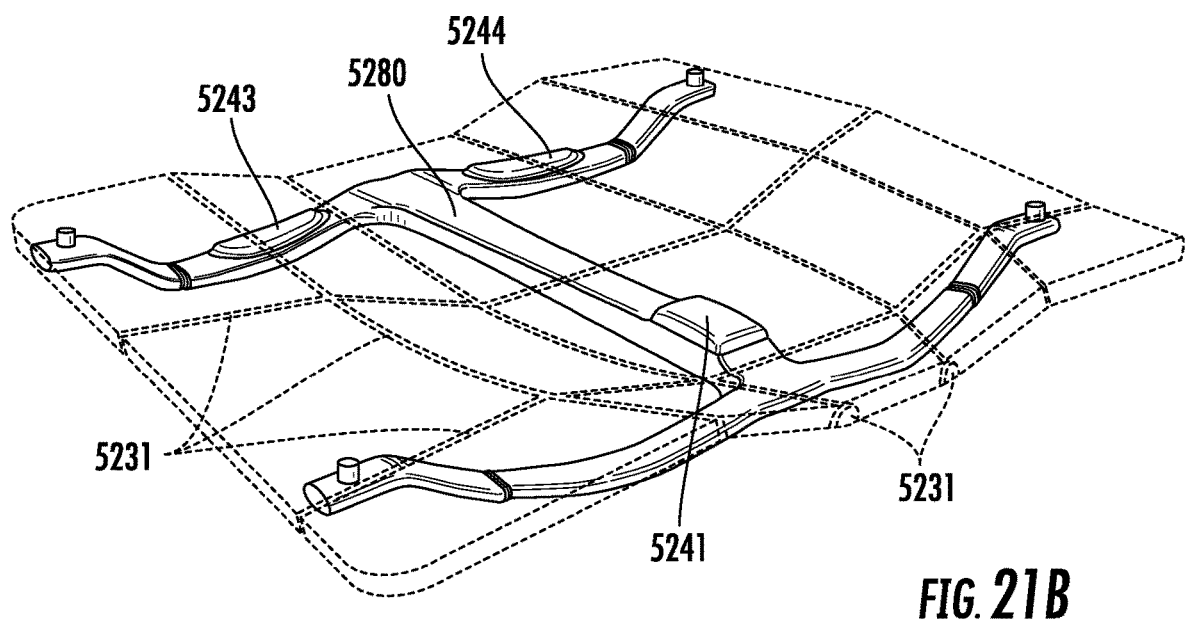
FIG. 21B is a perspective view of the passenger seat of FIG. 21A.
Figure 22:
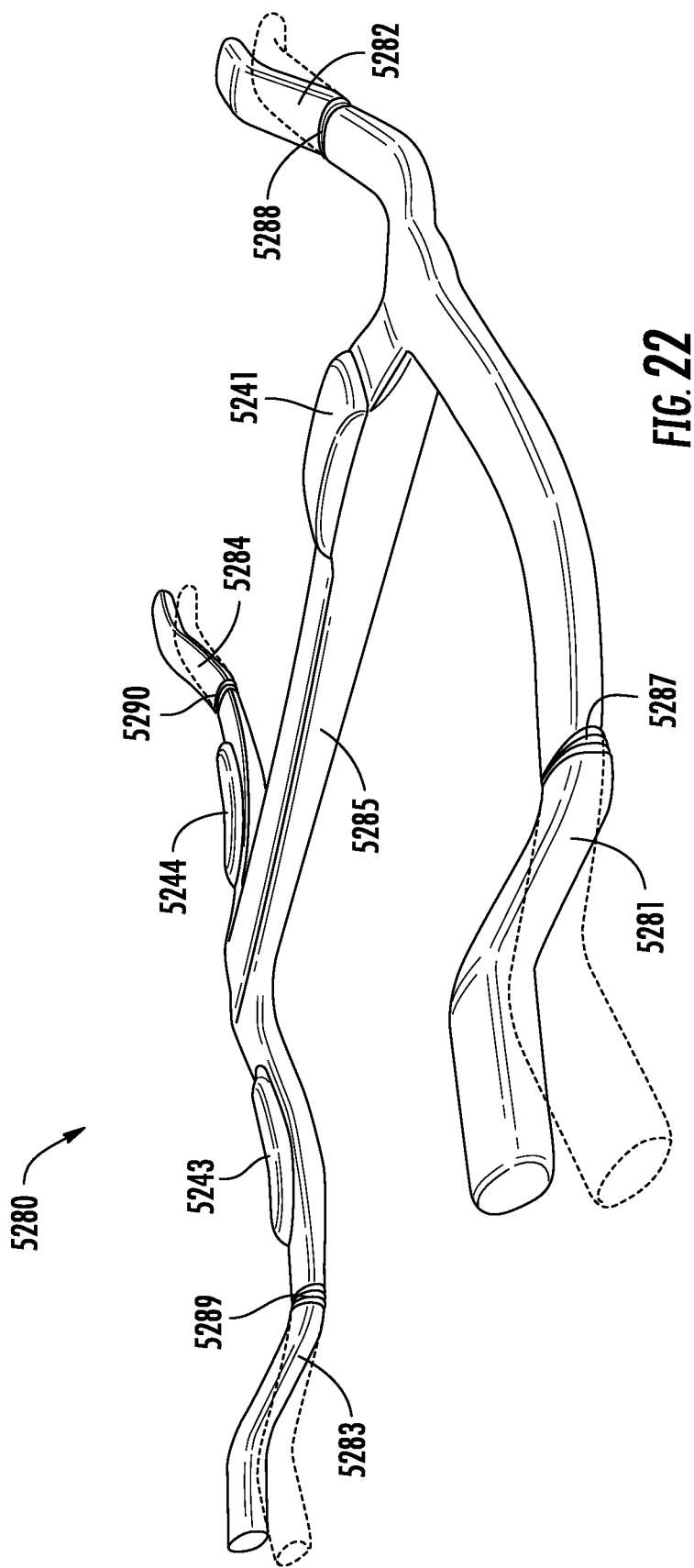
FIG. 22 is a perspective view of the passenger seat of FIG. 21A.

In some embodiments, as shown in FIGS. 21A, 21B, and 22, the seat bottom assembly 5201 may include a bottom support structure 5280 and a plurality of seat surface panels 5203-5217. The bottom support structure 5280 may be an "H" or "I" shape structure with a middle portion 5285, a forward left arm 5281, a forward right arm 5282, a rear left arm 5283, and a rear right arm 5284. As shown in FIG. 22, each arm of the bottom support structure 5280 may include a flexible section (5287-5290) configured to allow an outer portion of the each leg to pivot with respect to the remaining portion of the leg. In some embodiments, the members 4131-4143 may attach directly to a rear side of the respective panel (4104-4107). In some embodiments, the bottom support structure 5280 may include one or more support pads for attaching to the seat surface panels 5203-5217. For example, the middle portion 5285 may include support pad 5241, rear left arm 5283 may include support pad 5243, and rear right arm 5284 may include support pad 5244. The support pads may comprise flexible material.

Although FIGS. 21A and 21B show embodiments of the seat bottom assembly 5201 that include front, middle, and rear rows of 5 seat panels each (15 total seat panels), the seat bottom assembly 5201 may include any number of seat panels. In addition, in some or all of the spaces between adjacent seat panels, the seat bottom assembly 5201 may include flexible portion 5231.

Figure 23:
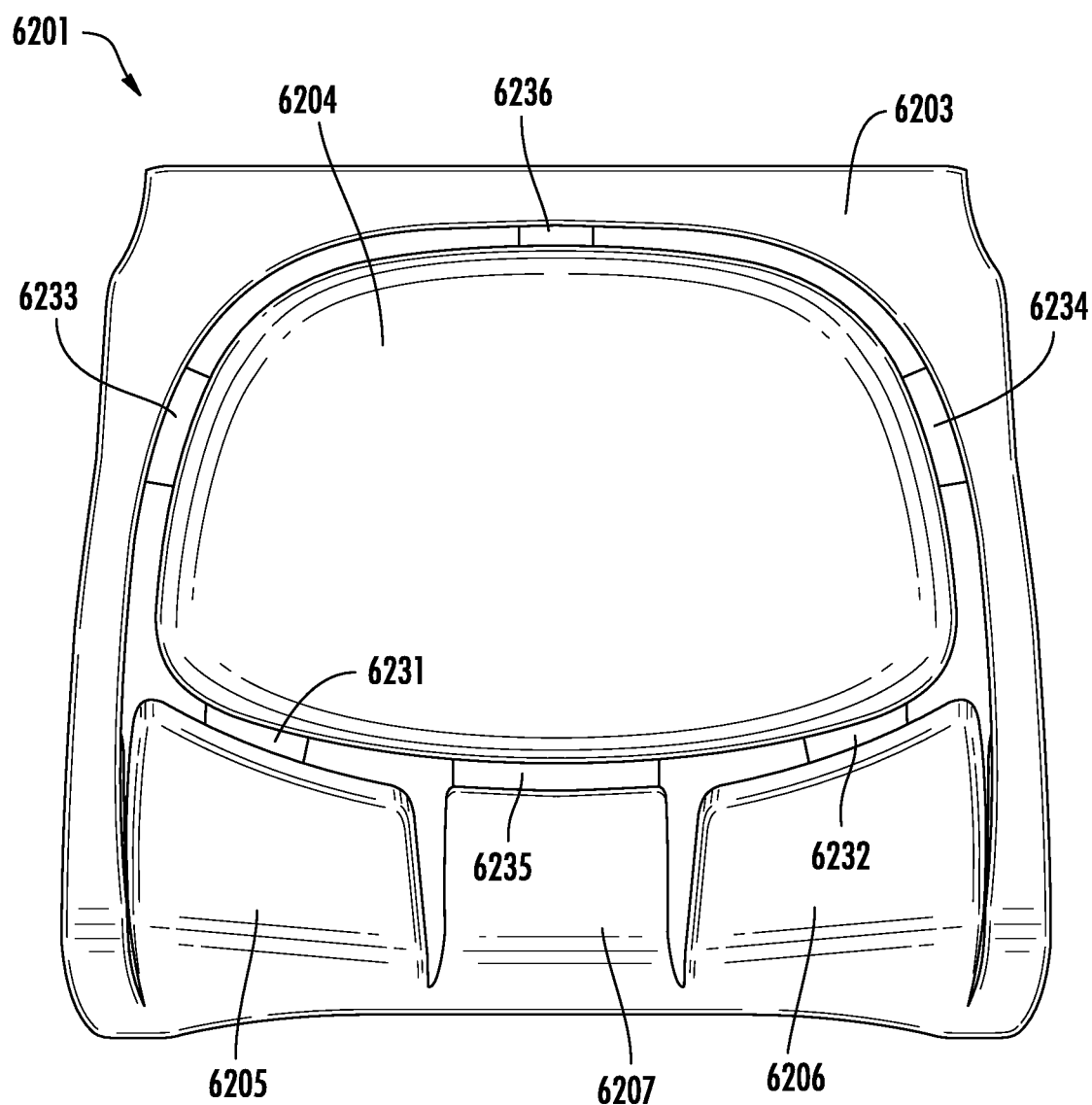
FIG. 23 is a top view of a passenger seat according to certain embodiments of the present invention.

In some embodiments, as shown in FIG. 23, the seat bottom assembly 6201 may include a frame 6203, a main panel 6204, and two forward leg panels 6205 and 6206. In addition, the seat bottom assembly 6201 may include a center forward panel 6207 disposed between the two forward leg panels 6205 and 6206. The panels 6204-6207 may be attached to the frame 6203 (and/or one another) with one or more attachment members. For example, the main panel 6204 may be attached to the frame 6203 using left attachment 6233, right attachment 6234, and center attachment 6236. Further, the main panel 6204 may be attached to left forward leg panel 6205, right forward leg panel 6206, and center forward panel 6207 using attachments 6231, 6232, and 6235, respectively.

The components of the seat 100 may be formed of materials including, but not limited to, carbon composite, plastic, thermoplastic, steel, aluminum, stainless steel, other plastic or polymer materials, other metallic materials, other composite materials, or other similar materials. Moreover, the components of the seat 100 may be attached to one another via suitable fasteners, which include, but are not limited to, screws, bolts, rivets or other mechanical or chemical fasteners.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A seat back assembly comprising:
   a plurality of panels arranged in a vertical direction;
   at least one connection member that connects adjacent panels, wherein the at least one connection member is integrally formed with each of the adjacent panels; and
   a rear spine member attached to an aft side of each of the plurality of panels;
   at least one suspension member,
     wherein the rear spine member comprises an arc shape such that at least one panel in the vertical arrangement of the plurality of panels is disposed aft of a lowermost panel of the plurality of panels;
   wherein the at least one suspension member is directly coupled to the rear spine member and the plurality of panels; and
     each of the plurality of panels comprises a rectangular shape.

2. The seat back assembly of claim 1, wherein the plurality of panels comprises at least four panels.

3. The seat back assembly of claim 1, wherein each connection member comprises at least one of a hinge, a portion with decreased thickness, a portion with smaller cross-sectional area, and a portion made from a flexible material.

4. The seat back assembly of claim 1, wherein the plurality of panels are not attached to one another.

5. The seat back assembly of claim 1, wherein each suspension member comprises at least one of a spring, a box, and a cylinder.

6. The seat back assembly of claim 1, wherein each suspension member comprises a leaf spring, wherein the leaf spring comprises (i) a connection on a rear side thereof to the rear spine member and (ii) two connections on a front side thereof to a respective panel.

7. A seat back assembly comprising:
a plurality of panels arranged in a vertical direction;
at least one connection member that connects adjacent panels, wherein the at least one connection member is integrally formed with each of the adjacent panels;
a plurality of suspension members, whereon each suspension member is directly coupled to an aft side of a respective panel; and
a rear spine member disposed on an aft side of the plurality of panels, wherein the rear spine member is directly coupled to each of the plurality of suspension members.

8. The seat back assembly of claim 7, wherein the rear spine member comprises an arc shape such that (i) at least one panel in the vertical arrangement of the plurality of panels is disposed aft of a lowermost panel of the plurality of panels and (ii) at least one panel in the vertical arrangement of the plurality of panels is disposed aft of an uppermost panel of the plurality of panels.

9. The seat back assembly of claim 7, wherein the plurality of panels comprises at least four panels.

10. The seat back assembly of claim 7, wherein each connection member comprises at least one of a hinge, a portion with decreased thickness, a portion with smaller cross-sectional area, and a portion made from a flexible material.

11. The seat back assembly of claim 7, wherein the plurality of panels are not attached to one another.

12. The seat back assembly of claim 7, wherein each suspension member comprises at least one of a spring, a box, and a cylinder.

13. The seat back assembly of claim 7, wherein each suspension member comprises a leaf spring, wherein the leaf spring comprises (i) a connection on a rear side thereof to the rear spine member and (ii) two connections on a front side thereof to a respective panel.

14. A passenger seat comprising:
at least one seat pan assembly; and
at least one seat back assembly, wherein each of the at least one seat back assembly comprises:
four panels arranged in a vertical direction;
at least one connection member that connects adjacent panels, wherein the at least one connection member is integrally formed with each of the adjacent panels;
four suspension members, whereon each suspension member is directly coupled to an aft side of a respective panel; and
a rear spine member disposed on an aft side of the four panels, wherein the rear spine member is directly coupled to each of the four suspension members and extends from an uppermost panel to a respective seat pan assembly.

15. The passenger seat of claim 14, wherein a lowermost panel has a smaller height than the other three panels.

16. The passenger seat of claim 14, wherein the rear spine member comprises an arc shape such that (i) at least one panel in the vertical arrangement of the four panels is disposed aft of a lowermost panel of the four panels and (ii) at least one panel in the vertical arrangement of the four panels is disposed aft of an uppermost panel of the four panels.

17. The passenger seat of claim 14, wherein each connection member comprises at least one of a hinge, a portion with decreased thickness, a portion with smaller cross-sectional area, and a portion made from a flexible material.

* * * * *